(12) United States Patent
Nakamura et al.

(10) Patent No.: US 6,823,408 B2
(45) Date of Patent: Nov. 23, 2004

(54) ELECTRONIC EQUIPMENT, AND METHOD FOR CONTROLLING STATE OF PHYSICAL LAYER CIRCUIT THEREFOR

(75) Inventors: Akira Nakamura, Tokyo (JP); Tetsuya Sato, Kanagawa (JP)

(73) Assignee: Sony Corporation (JP)

( * ) Notice: Subject to any disclaimer, the term of this patent is extended or adjusted under 35 U.S.C. 154(b) by 434 days.

(21) Appl. No.: 09/840,490

(22) Filed: Apr. 23, 2001

(65) Prior Publication Data

US 2002/0073256 A1 Jun. 13, 2002

(30) Foreign Application Priority Data

Apr. 27, 2000 (JP) .................................... P2000-128127

(51) Int. Cl.⁷ ............................................. G06F 13/00
(52) U.S. Cl. ..................... 710/100; 710/112; 710/113; 370/400
(58) Field of Search ................................ 710/100, 112, 710/113, 36; 370/400, 411, 419, 426, 461, 462, 463; 709/232

(56) References Cited

U.S. PATENT DOCUMENTS

| | | | | |
|---|---|---|---|---|
| 5,495,481 A | | 2/1996 | Duckwall | |
| 5,519,709 A | * | 5/1996 | Albrecht et al. | ............ 370/407 |
| 5,604,735 A | * | 2/1997 | Levinson et al. | ........... 370/360 |
| 5,729,541 A | * | 3/1998 | Hamalainen et al. | ....... 370/337 |
| 5,768,250 A | * | 6/1998 | Albrecht | ..................... 370/216 |
| 5,802,048 A | * | 9/1998 | Duckwall | .................... 370/389 |
| 5,802,289 A | * | 9/1998 | Oprescu | ...................... 709/248 |
| 5,802,301 A | * | 9/1998 | Dan et al. | .................... 709/223 |
| 6,157,972 A | * | 12/2000 | Newman et al. | ............ 710/100 |
| 6,347,097 B1 | * | 2/2002 | Deng | ........................ 370/498 |
| 6,430,225 B1 | * | 8/2002 | Okawa et al. | .............. 375/242 |
| 6,513,085 B1 | * | 1/2003 | Gugel et al. | ................ 710/305 |
| 6,529,977 B1 | * | 3/2003 | Nyu | ........................... 710/100 |

\* cited by examiner

*Primary Examiner*—Xuan M. Thai
(74) *Attorney, Agent, or Firm*—Lerner, David, Littenberg, Krumholz & Mentlik, LLP

(57) ABSTRACT

A system is designed to avoid problems that may occur if a physical layer misunderstands the kind of signal it receives and erroneously changes its state to a suspend state. When a node B receives an idle signal (i.e., a request cancel signal) from a node A (child node), the node B changes its state to a wait grant state where the node B waits to receive a grant signal from a node C (parent node) while keeping the request signal to the node C. The node B confirms that it has received the grant signal from the node C, and after that, changes its state from the wait grant state to a wait idle state where the node B transmits an idle signal to the node C, and waits until the grant signal from the node C changes into an idle signal. The node B confirms that it has received the idle signal from the node C, and after that, returns its state from the wait idle state to an idle state. According to this procedure, the node B is free from the situation in which it receives a grant signal from the node C in the idle state. This arrangement prevents the node B from misunderstanding that it has received a suspend signal and erroneously changing its state to a suspend state.

12 Claims, 30 Drawing Sheets

(BUS INITIALIZATION)

(PRIOR ART)

(TREE IDENTIFICATION)

(PRIOR ART)

(SELF IDENTIFICATION)

(PRIOR ART)

F I G. 8 B
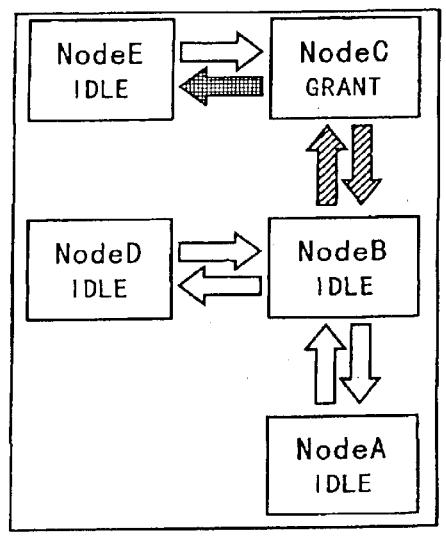
F I G. 8 C
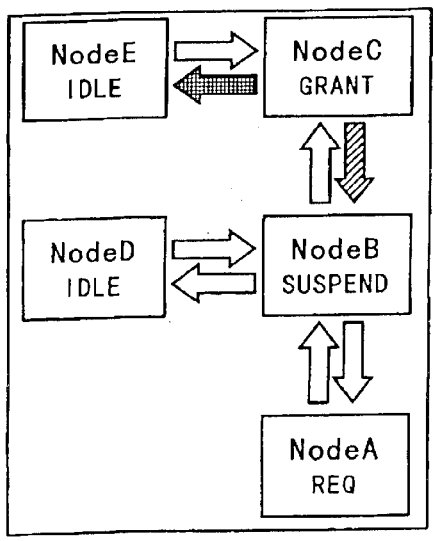

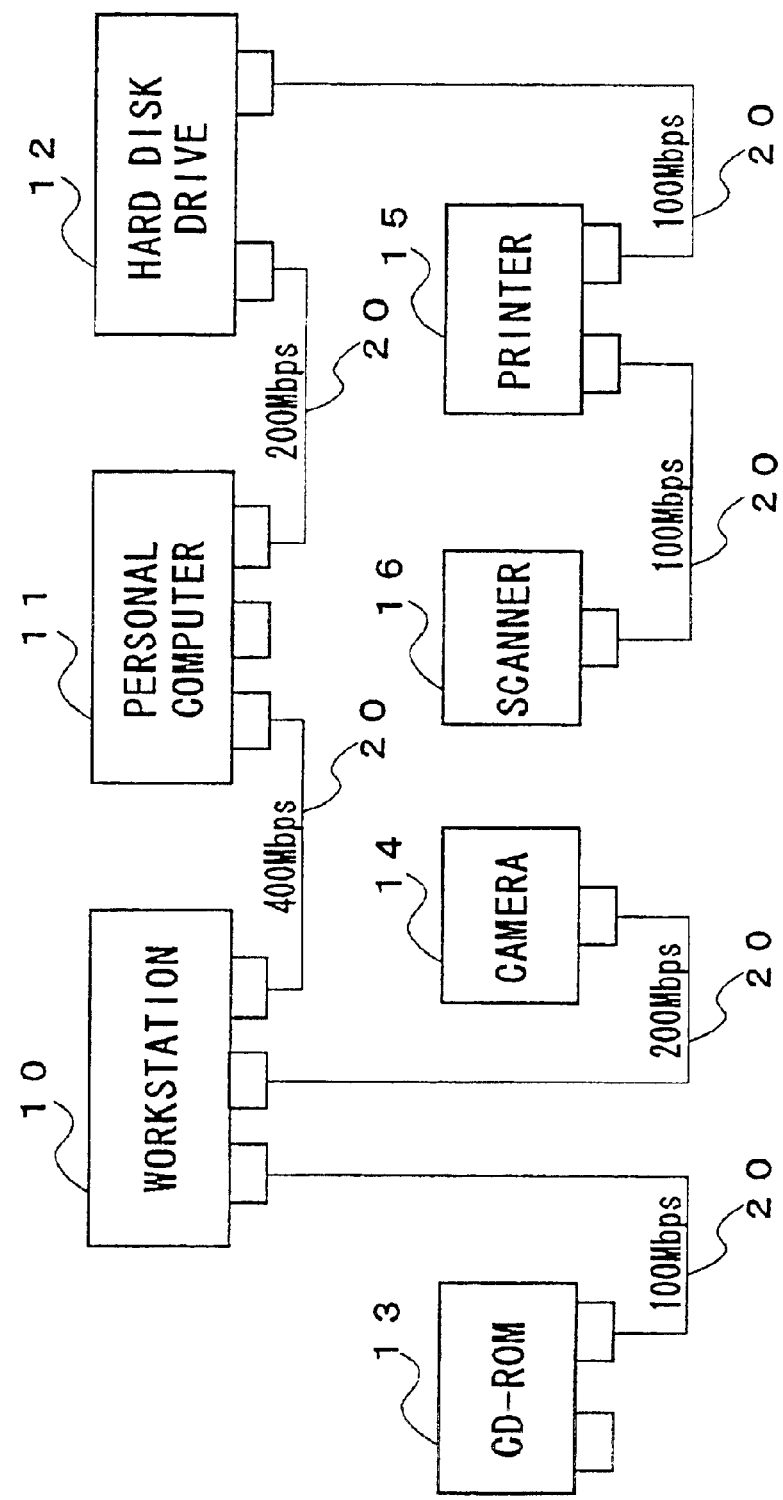

F I G. 1 1
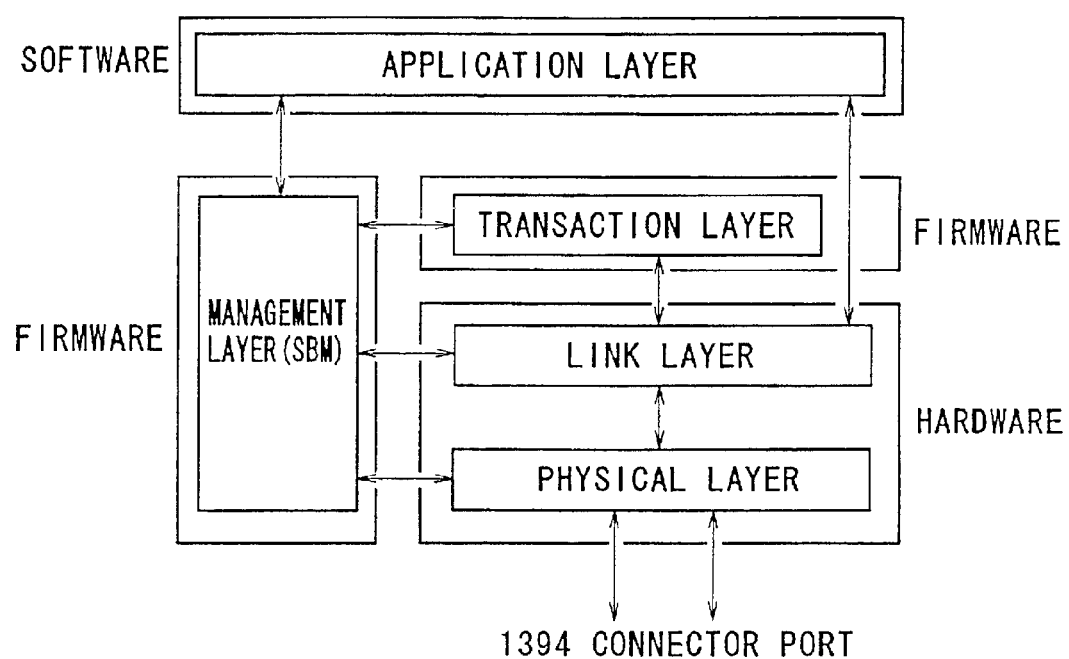
F I G. 1 2
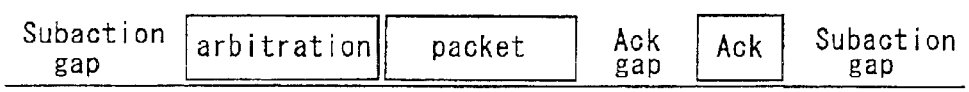

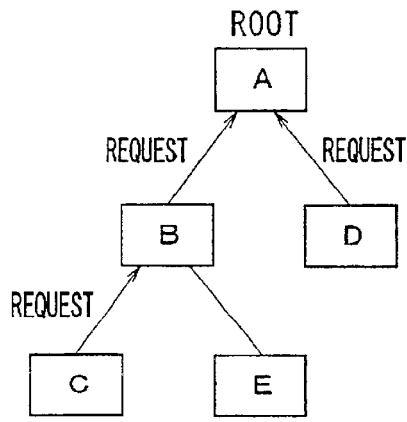
FIG. 13A
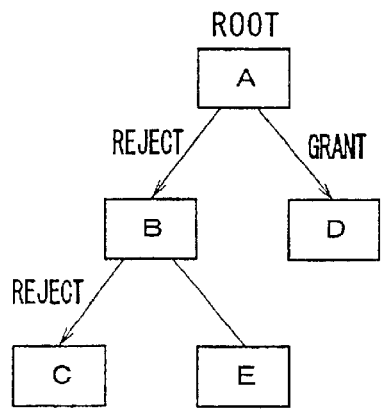
FIG. 13B
FIG. 14
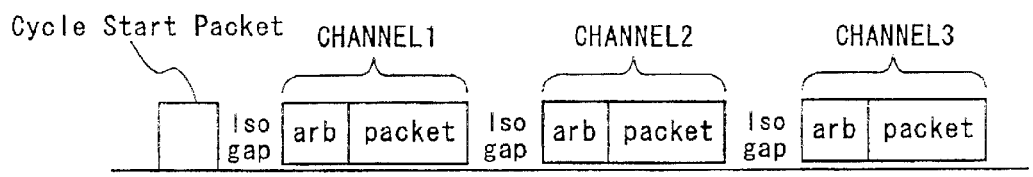

FIG. 16

| OFFSETS | NAMES | FUNCTIONS |
|---|---|---|
| 000h | STATE_CLEAR | STATE AND CONTROL INFORMATION |
| 004h | STATE_SET | SET STATE_CLEAR BIT |
| 008h | NODE_IDs | INDICATE 16-BIT NODE ID |
| 00Ch | RESET_START | START COMMAND RESET |
| 018h-01Ch | SPLIT_TIMEOUT | PRESCRIBE MAXIMUM TIME OF SPLIT |
| 200h | CYCLE_TIME | CYCLE TIME |
| 210h | BUSY_TIMEOUT | PRESCRIBE LIMIT OF RETRY |
| 21Ch | BUS_MANAGER | INDICATE BUS MANAGER ID |
| 220h | BANDWIDTH_AVAILABLE | INDICATE BANDWIDTH THAT CAN BE ASSIGNED TO ISOCHRONOUS COMMUNICATION |
| 224h-228h | CHANNELS_AVAILABLE | INDICATE USED STATE OF EACH CHANNEL |

| 900h | Output Master Plug Register |
|---|---|
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 18

| 400h | 04h | crc_length | rom_crc_value |
|---|---|---|---|

Bus_info_block

| 404h | "1394" | | |
|---|---|---|---|
| 408h | imc/cmc/isc/bmc reserved | cyc_clk_acc | max_rec | reserved |
| 40Ch | Company_ID | | Chip_ID_hi |
| 410h | Chip_ID_lo | | |

Root_directory

| 414h | root_length | CRC |
|---|---|---|
| 418h | 03h | module_vendor_id |
| 41Ch | 0Ch | node_capabilities |
| 420h | 8Dh | node_unique_id offset |
| 424h | D1h | unit_directory_offset |
| 428h | Optional. | |

Unit_directory

| | unit_directory_length | CRC |
|---|---|---|
| | 12h | unit_spec_id |
| | 13h | unit_sw_version |
| | Optional. | |

FIG. 20A oMPR

| data rate capability | broadcast channel base | nonpersistent extension field | persistent extension field | reserved | number of output plugs |
|---|---|---|---|---|---|
| 2 | 6 | 8 | 8 | 3 | 5 (bit) |

FIG. 20B oPCR[n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 (bit) |

FIG. 20C iMPR

| data rate capability | reserved | nonpersistent extension field | persistent extension field | reserved | number of output plugs |
|---|---|---|---|---|---|
| 2 | 6 | 8 | 8 | 3 | 5 (bit) |

FIG. 20D iPCR[n]

| on-line | broadcast connection counter | point-to-point connection counter | reserved | channel number | reserved |
|---|---|---|---|---|---|
| 1 | 6 | 6 | 2 | 6 | 16 (bit) |

FIG. 23

| The General Subunit Identifier Descriptor ||
|---|---|
| address | contents |
| 00 00₁₆ | descriptor_length |
| 00 01₁₆ | |
| 00 02₁₆ | generation_ID |
| 00 03₁₆ | size_of_list_ID |
| 00 04₁₆ | size_of_object_ID |
| 00 05₁₆ | size_of_object_position |
| 00 06₁₆ | number_of_root_object_lists(n) |
| 00 07₁₆ | |
| 00 08₁₆ | root_object_list_id_0 |
| ⋮ | ⋮ |
| | root_object_list_id_n-1 |
| | subunit_dependent_length |
| | subunit_dependent_information |
| | manufacturer_dependent_length |
| | manufacturer_dependent_information |

FIG. 24

| generation_ID values ||
|---|---|
| generation_ID | meaning |
| 00₁₆ | Data structures and command sets as specified in the AV/C General Specification, version 3.0 |
| all others | reserved for future specification |

FIG. 25

| List ID Value Assignment Ranges ||
|---|---|
| range of values | list definition |
| 0000₁₆-0FFF₁₆ | reserved |
| 1000₁₆-3FFF₁₆ | subunit-type dependent |
| 4000₁₆-FFFF₁₆ | reserved |
| 1 0000₁₆-max list ID value | subunit-type dependent |

| ctype/response | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 ~ 0111 | (reserved for future specification) |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

FIG. 29A

| subunit_type | |
|---|---|
| 00000 | Video monitor |
| ~ | (reserved) |
| 00011 | Disc recorder/Player |
| 00100 | Tape recorder/Player |
| 00101 | Tuner |
| 00111 | Video Camera |
| ~ | (reserved) |
| 11100 | Vendor unique |
| 11101 | reserved |
| 11110 | Subunit type extended to next byte |
| 11111 | Unit |

FIG. 29B

| opcode:Operation Code | |
|---|---|
| 00h | VENDOR-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | |

FIG. 29C

FIG. 30A tape recorder/player IN THE CASE OF ID0

| AV/C control | | | PLAY | FORWARD |
|---|---|---|---|---|
| CTS=0000 | ctype=0000 | subunit type=00100 | id=000 | opcode=C3h | operand=75h |

FIG. 30B tape recorder/player IN THE CASE OF ID0

| AV/C accepted | | | PLAY | FORWARD |
|---|---|---|---|---|
| CTS=0000 | response=1001 | subunit type=00100 | id=000 | opcode=C3h | operand=75h |

F I G. 3 2
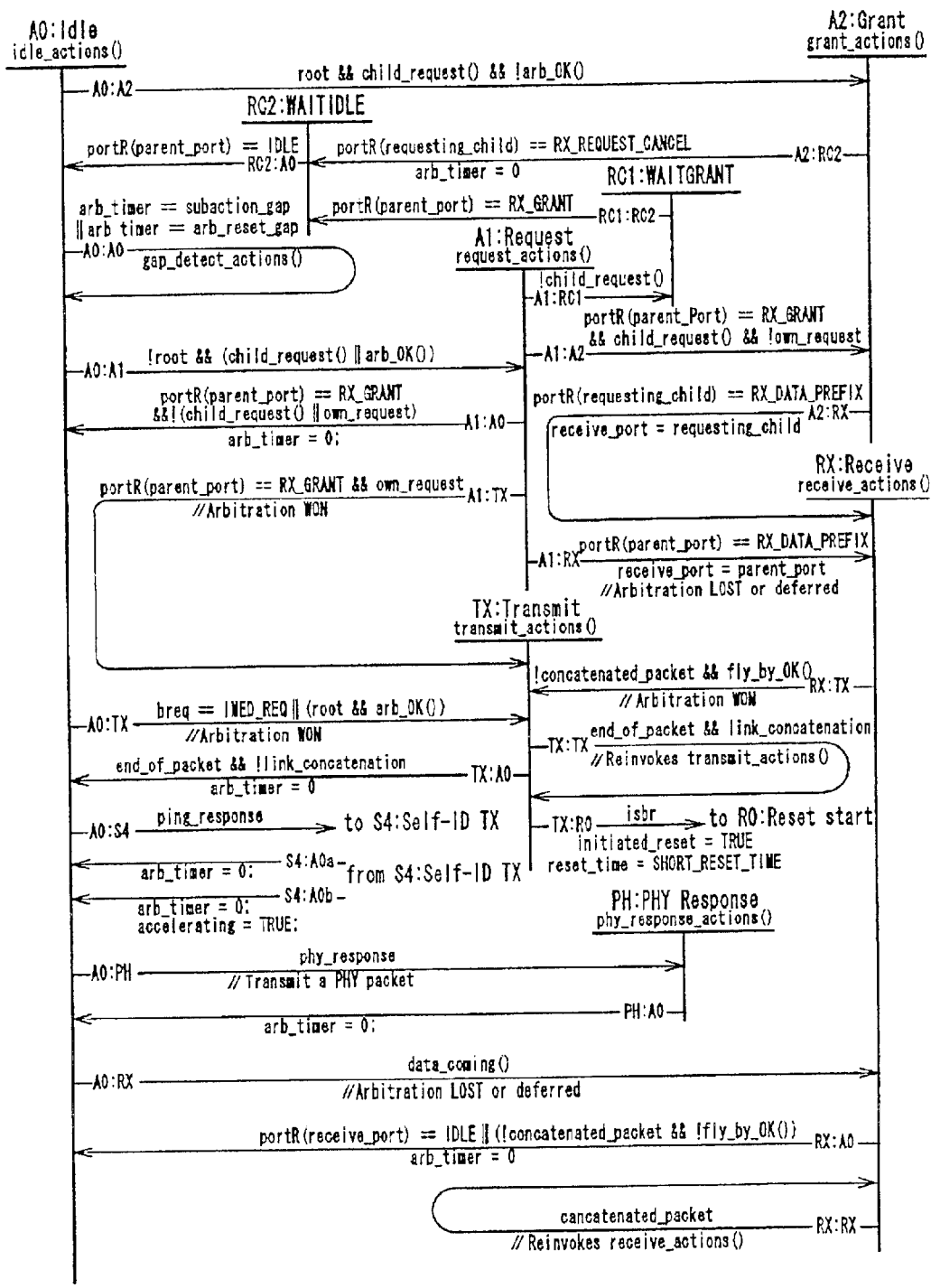

ELECTRONIC EQUIPMENT, AND METHOD FOR CONTROLLING STATE OF PHYSICAL LAYER CIRCUIT THEREFOR

CROSS-REFERENCE TO RELATED APPLICATIONS

The present application claims priority from Japanese Application No. P2000-128127 filed Apr. 27, 2000, the disclosure of which is hereby incorporated by reference herein.

BACKGROUND OF THE INVENTION

The present invention relates to electronic equipment provided with a physical layer circuit constituting a physical layer which conforms to the IEEE 1394 standard, and a method for controlling the state of the physical layer circuit.

More specifically, the present invention relates to electronic equipment in which the physical layer circuit is operated in such a manner that, when receiving a first signal from a child node, the physical layer circuit changes its state from a first state into a second state and sends a first signal to a parent node, and when receiving a third signal for canceling the first signal from the child node before receiving the second signal corresponding to the first signal from the parent node, the physical layer circuit sends the third signal to the parent node after receiving the second signal from the parent node, and furthermore, the physical layer circuit returns its state from the second state to the first state after receiving the third signal from the parent node, thereby avoiding the occurrence of trouble which may be caused if the physical layer circuit receives the second signal from the parent node in the first state.

The present invention also relates to electronic equipment in which the physical layer circuit is operated in such a manner that, when receiving a first signal from a child node, the physical layer circuit changes its state from a first state into a second state and sends the first signal to a parent node, and when receiving a third signal for canceling the first signal from the child node after receiving the second signal corresponding to the first signal from the parent node and shifting its state from the second state to the third state, the physical layer circuit sends the third signal to the parent node, and furthermore, the physical layer circuit returns its state from the third state to the first state after receiving the third signal from the parent node, thereby avoiding the occurrence of trouble which may be caused if the physical layer circuit receives the second signal from the parent node in the first state.

As the standard defining the interface for supporting high-speed data transmission and real-time transmission as the interface for multimedia data transmission, the IEEE 1394 high-performance serial bus standard (the IEEE 1394 standard) is known. The IEEE 1394 standard defines data transmission at rates of 100 Mbps (98.304 Mbps), 200 Mbps (196.608 Mbps), and 400 Mbps (393.216 Mbps), and defines a 1394 port with higher transmission rate to have compatibility with its lower transmission rate. This standard allows data transmissions at rates of 100 Mbps, 200 Mbps, and 400 Mbps in one and the same network.

In addition, the IEEE 1394 standard employs a transmission format in the Data/Strobe link (DS-Link) coding method. In the transmission format in the Data/Stroke link coding method, as shown in FIG. 1, transmission data is converted into two signals including data and strobe for compensating the signal thereof, and the exclusive OR of these two signals is obtained, thereby generating clocks. The IEEE 1394 standard also defines a cable 200 having a structure such as shown in the cross-sectional view of FIG. 2, including: first shielding layers 201; two pairs of twisted pair lines (i.e., signal lines) 202, each shielded by a first shielding layer 201; power supply lines 203; and a second shielding layer 204 which entirely covers the cable constituted by tying the first shielding layers 201, the twisted pair lines 202, and the power supply lines 203 together.

The IEEE 1394 standard performs arbitration for obtaining a bus prior to data transmission, and, as a control signal for arbitration, defines an arbitration signal. In addition, the IEEE 1394 standard automatically reconfigures the entire bus topology by resetting the bus at the time when a node is added to or deleted from the bus. The arbitration signal is also defined as a control signal required for the topology reconfiguration.

The logical values of the arbitration signal in the physical layer are three values of "0", "1", and "Z". These values are produced in accordance with the rules shown in Tables 1 and 2 below, and are decoded in accordance with the rule shown in Table 3 below.

TABLE 1

| Transmit arbitration signal A | Drivers | | |
|---|---|---|---|
| (Arb_A_Tx) | Strb_Tx | Strb_Enable | Comments |
| Z | — | 0 | TPA driver is disabled |
| 0 | 0 | 1 | TPA driver is enabled, strobe is low |
| 1 | 1 | 1 | TPA driver is enabled, strobe is high |

TABLE 2

| Transmit arbitration signal B | Drivers | | |
|---|---|---|---|
| (Arb_B_Tx) | Data_Tx | Data-Enable | Comments |
| Z | — | 0 | TPB driver is disabled |
| 0 | 0 | 1 | TPB driver is enabled, data is low |
| 1 | 1 | 1 | TPB driver is enabled, data is high |

TABLE 3

| Received arbitration comparator value (Arb_n$^a$_Rx) | Transmitted arbitration signal for this port (Arb_n$^a$_Tx) | Interpreted arbitration signal (Arb_n$^a$) | Comments |
|---|---|---|---|
| Z | Z | Z | If this port is transmitting a Z, then the received signal will be the same as transmitted by |
| 0 | Z | 0 | |
| 1 | Z | 1 | |

TABLE 3-continued

| Received arbitration comparator value (Arb_n<sup>a</sup>_Rx) | Transmitted arbitration signal for this port (Arb_n<sup>a</sup>_Tx) | Interpreted arbitration signal (Arb_n<sup>a</sup>) | Comments |
|---|---|---|---|
|  |  |  | the port on the other end of the cable. |
| Z | 0 | 1 | If the comparator is receiving a Z while this port is sending a 0, then the other port must be sending a 1. This is the first half of the 1's dominance rule. |
| 0 | 0 | 0 | The other port is sending a 0 or a Z. |
| Z | 1 | 1 | The other port must be sending a 0. This is the other half of the 1's dominance rule. |
| 1 | 1 | 1 | The other port is sending a 1 or a Z. |

<sup>a</sup>"n" is "A" or "B". This table applies to both signal pairs.

In addition, the physical layer encodes the line state by use of two transmission arbitration signals Arb_A_Tx and Arb_B_Tx in accordance with the rules shown in Table 4 below, and decodes the line state by use of receive arbitration signals Arb_A and Arb_B in accordance with the rules shown in Table 5 below.

TABLE 4

| Arbitration transmit | | | |
|---|---|---|---|
| (Arb_A_Tx) | (Arb_B_Tx) | Line state name | Comments |
| Z | Z | IDLE | sent to indicate a gap |
| Z | 0 | TX_REQUEST | sent to parent to request the bus |
|  |  | TX_GRANT | sent to child when bus is granted |
| 0 | Z | TX_PARENT_NOTIFY | sent to parent candidate during tree-ID |
| 0 | 1 | TX_DATA_PREFIX | sent before any packet data and between blocks of packet data in the case of concatenated subactions |
| 1 | Z | TX_CHILD_NOTIFY | sent to child to acknowledge the parent notify |
|  |  | TX_IDENT_DONE | sent to parent to indicate that |

TABLE 4-continued

| Arbitration transmit | | | |
|---|---|---|---|
| (Arb_A_Tx) | (Arb_B_Tx) | Line state name | Comments |
| 1 | 0 | TX_DATA_END | self-ID is complete sent at the end of packet transmission |
| 1 | 1 | BUS_RESET | sent to force a bus re-configuration |

TABLE 5

| Interpreted arbitration signals | | | |
|---|---|---|---|
| (Arb_A) | (Arb_B) | Line state name | Comments |
| Z | Z | IDLE | the attached peer PHY is inactive |
| Z | 0 | RX_PARENT_NOTIFY | the attached peer PHY wants to be a child |
|  |  | RX_REQUEST_CANCEL | attached peer PHY has abandoned a request (this PHY is sending a grant) |
| Z | 1 | RX_IDENT_DONE | the child PHY has completed its self-ID |
| 0 | Z | RX_SELF_ID_GRANT | the parent PHY is granting the bus for a self-ID |
|  |  | RX_REQUEST | a child PHY is requesting the bus |
| 0 | 0 | RX_ROOT_CONTENTION | the attached peer PHY and this PHY both want to be child |
|  |  | RX_GRANT | the parent PHY is granting control of the bus |
| 0 | 1 | RX_PARENT_HANDSHAKE | attached peer PHY acknowledges parent notify |
|  |  | RX_DATA_END | the attached peer PHY has finished sending a block of data is about to release the bus |
| 1 | Z | RX_CHILD_HANDSHAKE | attached peer PHY acknowledges TX_CHILD_NOTIFY (the peer PHY is a child of this PHY) |
| 1 | 0 | RX_DATA_PREFIX | the attached per PHY is about to send packet |

TABLE 5-continued

| Interpreted arbitration signals | | | |
|---|---|---|---|
| (Arb_A) | (Arb_B) | Line state name | Comments |
| 1 | 1 | BUS_RESET | data or has finished sending a block of packet data and is about to send more send to force a bus reconfiguration |

By use of the arbitration signals described above, the topology is automatically configured through the bus initialization phase, tree identification phase, and self-identification phase in this order.

At the bus initialization phase, the bus reset signal changes all the nodes into particular states, to entirely clear the topology information. As a result of the bus initialization, each node has information only about whether the node itself is a branch (i.e., whether it is directly connected to a plurality of nodes adjacent thereto), whether the node is a leaf (i.e., whether it is connected to only a single node adjacent thereto), and whether the node is independent (i.e., whether it is connected to no nodes adjacent thereto). FIG. 3A is a diagram showing a network constituted by leaf nodes and branch nodes.

At the tree identification phase, the entire network topology is converted into one tree in which one node is designated as a root. All the physical connections connected to the root indicate the direction of the root node. Each port for connection in each node is assigned a label to indicate the direction, and is referred to as a "parent" port (in the case where the port is connected to a node closer to the root), or a "child" port (in the case where the port is connected to a node more remote from the root). A port which is not connected to any node is assigned with a label "off", and does not participate in the arbitration process conducted afterwards. FIG. 3B shows the network constituted at the completion of the tree identification process.

At the self-identification phase, each node is provided with an opportunity to select its own specific physical_ID to identify itself with respect to an arbitrary control element associated with the bus. This process is also necessary to control electric power of low level, and to produce a topology map of the system required for determining the rate of each data path.

The self-identification process employs a theoretic decision selection process. Specifically, a root node leaves the media control to the node associated with the connection port having the smallest number, and waits until the node sends an "ident_done" signal for notifying that the node itself and all the child nodes thereof have completed self-identification. After that, the root node leaves the control to the node associated with the connection port having the next larger number, and waits until the processing of the node has been completed. When the nodes associated with all the ports of the root have completed their processings, the root itself conducts self-identification. The child nodes conduct the same process as above, respectively. The completion of the self-identification process is acknowledged when the bus goes into an idle state over a subaction gap period.

Each node can send its self-identification information by sending one to four very short packets (Self-ID Packets) involving physical_ID or other control information to a cable. The physical_ID is a value obtained by simply counting the number of times the node receives self-identification information from the other nodes before it sends its self-identification packet. For example, the node which sends its self-identification packet first selects a 0 as a physical_ID, and the node which sends its self-identification packet second selects a 1 as a physical_ID. The same process is repeated to determine the physical_ID of the nodes which send their self-identification packets third and thereafter. FIG. 3C shows the network obtained at the completion of the self-identification process. As seen in FIG. 3C, each "child" port is assigned with a "ch-i" label by which the node connected to the port can be identified.

In the IEEE 1394–1995 and 1394.a definition, the behavior of the physical layer at the time it receives a signal for canceling a request at an arbitration phase is defined as follows: "when a child node which is making a request cancels the request, the physical layer (PHY) at the permission side observes its TX_GRANT signal to be returned thereto as a RX_REQUEST_CANCEL signal [Z0], and returns its state to an idle state" (The transition of A1:A0 and transition of A2:A0 in FIG. 4). FIG. 4 is a transition diagram at an arbitration phase, showing an A0 (Idle) state, an A1 (Request) state, an A2 (Grant) state, an RX (Receive) state, a TX (Transmit) state, and a PH (PHY Response) state, respectively.

However, as shown in Table 5 above, since the RX_GRANT signal [00] and the RX_SUSPEND signal [00] use an identical code, a problem arises in the above operation depending on the way that the physical layer is mounted. That is, although the physical layer is in the state of receiving the RX_GRANT signal from the parent node, when it observes the RX_REQUEST_CANCEL signal from the child node and changes its state into the idle state, the physical layer misunderstands the RX_GRANT signal from the parent node as the RX_SUSPEND signal. As a result, a situation may arise that the port connected to the parent node changes its state into a suspended state. FIG. 5 is a transition diagram at a port connection, showing a P0 state (Disconnected), a P1 state (Resuming), a P2 state (Active), a P3 state (Suspended Initiator), a P4 state (Suspended Target), a P5 state (Suspended), and a P6 state (Disabled), respectively.

Hereinafter, description will be made of the behavior of a node B at the time when a node A makes a request for the right to use the bus for transmission, and after that, the node A cancels the request, taking as an example the case where 5 nodes are connected to each other, with a node C as a root node as shown in FIG. 6A. In FIGS. 6A to 9C, arrows show transmission and receipt of data, and the terms IDLE, REQ, GRANT, RECEIVE, and TRANS in the respective nodes show the states of the physical layers of the respective nodes. The diagonally shaded arrows show a request signal and a grant signal (same signals are allocated in the IEEE 1394–1995 and 1394.a standard), the grid-patterned arrows show a data prefix signal, and the filled-in arrows show a data payload.

First, a flow from (1.1) to (1.8) will be described as a normal flow of data transmission from a point where the node A makes a request to obtain the right to use the bus for transmission until a point where the node A transmits data.

In order to obtain the right to use the bus for transmission, the node A changes its state into a request state where the node A transmits a request signal (FIG. 6A).

Upon receiving the request signal from the node A, the node B changes its state into a request state where the node B repeats the request signal to the node C which is a parent node (FIG. 6B).

Upon receiving the request signal from the node B, the node C confirms that there is no request signal other than that from the node B, and changes its state into a grant state where the node C transmits a grant signal to the node B. At the same time, the node C transmits a data prefix to the other node, that is, the node E. Upon receiving the data prefix signal, the node E changes its state into a receive state (FIG. 6C).

(1.4) Upon receiving the grant signal, the node B changes its state into a grant state where the node B repeats the grant signal to the node A. At the same time, the node B transmits a data prefix signal to the other node, that is, the node D. Upon receiving the data prefix signal, the node D changes its state into a receive state (FIG. 6D).

(1.5) Upon receiving the grant signal, the node A has obtained the right to use the bus for transmission. The node A therefore changes its state into a transmission state where the node A switches the request signal to the data prefix signal (FIG. 7A).

(1.6) Upon receiving the data prefix signal from the node A, the node B changes its state into a receive state where the node B repeats the data prefix signal to the nodes C, D. Upon receiving the data prefix signal from the node B, the node C changes its state into a receive state where the node C repeats the data prefix signal to the node E (FIG. 7B).

(1.7) After the node A keeps the data prefix signal for a period of time defined by the IEEE 1394 standard, the node A starts to transmit the data payload to the node B (FIG. 7C).

(1.8) Upon receiving the data payload from the node A, the node B repeats the data payload to the nodes C and D. Furthermore, upon receiving the data payload from the node B, the node C repeats the data payload to the node E (FIG. 7D).

Next, a flow from (2.1) to (2.3) will be described, where the node B receives an idle signal from the node A after the step (1.2) in the above-described flow has been completed and during when the node B is transmitting the request signal to the node C.

(2.1) In the state where the node B repeats the request signal to the node C and waits to receive a grant signal from the node C, if the node A cancels the request for any reason, the node B receives an idle signal from the node A (FIG. 8A).

(2.2) Upon receiving the idle signal from the node A, the node B returns its state into an idle state (FIG. 8B).

(2.3) If the node B, after returning its state into the idle state, receives a grant signal [Z0] already transmitted from the node C before the request signal [Z0] to the node C has been cancelled, the node B misunderstands that it has received a suspend signal [00] (the [00]signal received in the idle state is understood as a suspend signal), although it actually is the grant signal [Z0]. In this case, the node B erroneously changes its state into a suspend state, resulting in occurrence of troubles (FIG. 8C).

Next, a flow from (3.1) to (3.3) will be described, where the node B receives a request cancel signal from the node A after the step (1.4) has been completed in the above-described flow and during when the node B is receiving the grant signal from the node C.

(3.1) In the state where the node B repeats the request signal to the node C, and receives the grant signal from the node C, if the node A cancels a request for any reason, the node B receives a request cancel signal from the node A (FIG. 9A).

(3.2) Upon receiving the request cancel signal from the node A, the node B returns its state into an idle state (FIG. 9B).

(3.3) The node B, after returning to the idle state, is in the state where it is transmitting a request signal [Z0] to the node C and also is receiving a grant signal [Z0] from the node C. In this state, the node B misunderstands that it has received a suspend signal [00] (the [00]signal received in the idle state is understood as a suspend signal). As a result, the node B erroneously changes its state into a suspend state, resulting in occurrence of troubles (FIG. 9C).

SUMMARY OF THE INVENTION

An objective of the present invention is to provide electronic equipment capable of preventing the occurrence of problems such as described above, and a method for controlling the state of the physical layer circuit of such electronic equipment.

In an aspect of the present invention, electronic equipment comprises a physical layer circuit having a first transmitter operable to communicate with a child node; a second transmitter operable to communicate with a parent node; and a controller operable to control the physical layer circuit such that, when the physical layer circuit receives a first signal from the child node, the physical layer circuit changes from a first state to a second state and transmits the first signal to the parent node, when the physical layer circuit receives a third signal for canceling the first signal from the child node before receiving a second signal corresponding to the first signal from the parent node, the physical layer circuit transmits the third signal to the parent node after receiving the second signal from the parent node, and when the physical layer circuit receives the third signal from the parent node, the physical layer circuit changes from the second state to the first state.

For example, the physical layer circuit may constitute a physical layer which conforms to the IEEE 1394 standard. In such event, the first state may be an idle state and the second state may be a request state. The first signal may be a request signal for obtaining a right to use a bus for transmission, the second signal may be a grant signal, and the third signal may be an idle signal.

In another aspect of the present invention, a method for controlling a state of a physical layer circuit includes receiving in the physical layer circuit a first signal from a child node; upon receipt of the first signal, controlling the physical layer circuit to change from a first state to a second state and to transmit the first signal to the parent node; receiving in the physical layer circuit a third signal for canceling the first signal from the child node before receiving a second signal corresponding to the first signal from the parent node; controlling the physical layer circuit to transmit the third signal to the parent node after receiving the second signal from the parent node; and controlling the physical layer circuit to change from the second state to the first state after receiving the third signal from the parent node.

In the present invention, the physical layer circuit is free from the situation in which it receives a second signal from the parent node while in the first state. This arrangement serves to prevent the occurrence of problems which may arise if the physical layer circuit receives the second signal from the parent node while in the first state. For example, when the physical layer circuit constitutes a physical layer which conforms to the IEEE 1394 standard, if the physical layer circuit receives an idle signal for canceling a request signal from a child node in a request state, the physical layer circuit changes to an idle state after it has received an idle signal from the parent node. There arises no situation in which the physical layer circuit receives a grant signal [00] from the parent node while in the idle state. This arrangement serves to prevent the occurrence of problems that may result if the physical layer circuit misunderstands that it has received a suspend signal and changes its state to a suspend state.

In still another aspect of the present invention, electronic equipment comprises a physical layer circuit having a first transmitter operable to communicate with a child node; a second transmitter operable to communicate with a parent node; and a controller operable to control the physical layer circuit such that, when the physical layer circuit receives a first signal from the child node, the physical layer circuit changes from a first state to a second state and transmits the first signal to the parent node; when the physical layer circuit receives a third signal for canceling the first signal from the child node after receiving a second signal corresponding to the first signal from the parent node and changing from the second state to a third state, the physical layer circuit transmits the third signal to the parent node; and after receiving the third signal from the parent node, the physical layer circuit changes from the third state to the first state.

For example, the physical layer circuit may constitute a physical layer which conforms to the IEEE 1394 standard. In such event, the first state may be an idle state, the second state may be a request state, and the third state may be a grant state. The first signal may be a request signal for obtaining a right to use a bus for transmission, the second signal may be a grant signal, and the third signal may be an idle signal.

In a further method for controlling a state of a physical layer circuit according to the present invention, the physical layer circuit receives a first signal from a child node. Upon receipt of the first signal, the physical layer circuit is controlled to change from a first state to a second state and to transmit the first signal to the parent node. When the physical layer circuit receives a third signal for canceling the first signal from the child node after receiving a second signal corresponding to the first signal from the parent node and changing from the second state to a third state, the physical layer circuit is controlled to transmit the third signal to the parent node. When the physical layer circuit receives the third signal from the parent node, the physical layer circuit is controlled to change from the third state to the first state.

In the present invention, the physical layer circuit is free from the problem that it receives a second signal from the parent node while in the first state. This arrangement serves to prevent the occurrence of problems which may result if the physical layer circuit receives the second signal from the parent node while in the first state. For example, when the physical layer circuit constitutes a physical layer which conforms to the IEEE 1394 standard, if the physical layer circuit receives an idle signal for canceling a request signal from a child node while in a grant state, the physical layer circuit changes to an idle state after it has received an idle signal from the parent node. There arises no situation in which the physical layer circuit receives a grant signal [00] from the parent node while in the idle state. This arrangement serves to prevent the problems that may result if the physical layer circuit misunderstands that it has received a suspend signal, although it actually has received a grant signal, and changes its state to a suspend state.

BRIEF DESCRIPTION OF THE DRAWINGS

FIG. 10 is a block diagram showing an exemplary structure of a network constituted in compliance with the IEEE 1394 standard;

FIG. 11 is a diagram showing constituent elements and a protocol architecture of an interface in compliance with the IEEE 1394 standard;

FIG. 12 is a diagram showing a packet in asynchronous transmission;

FIGS. 13A and 13B are diagrams for illustrating arbitration;

FIG. 14 is a diagram showing a packet in isochronous transmission;

FIG. 16 is an explanatory diagram showing exemplary positions, names, and operations of the main CSRs;

FIG. 18 is an explanatory diagram showing an example of a bus info block, a root directory, and a unit directory;

FIGS. 20A to 20D are explanatory diagrams showing exemplary structures of an oMPR, an oPCR, an iMPR, and an iPCR, respectively;

FIG. 23 is an explanatory diagram showing an example of a data format of a descriptor;

FIG. 24 is an explanatory diagram showing an example of the generation ID of FIG. 23;

FIG. 25 is an explanatory diagram showing an example of the list ID of FIG. 23;

FIGS. 29A to 29C are explanatory diagrams showing specific examples of the AV/C command;

FIGS. 30A and 30B are explanatory diagrams showing specific examples of the command and the response of the AV/C command;

FIG. 32 is a transition diagram at an arbitration phase;

DETAILED DESCRIPTION

Figure 1:
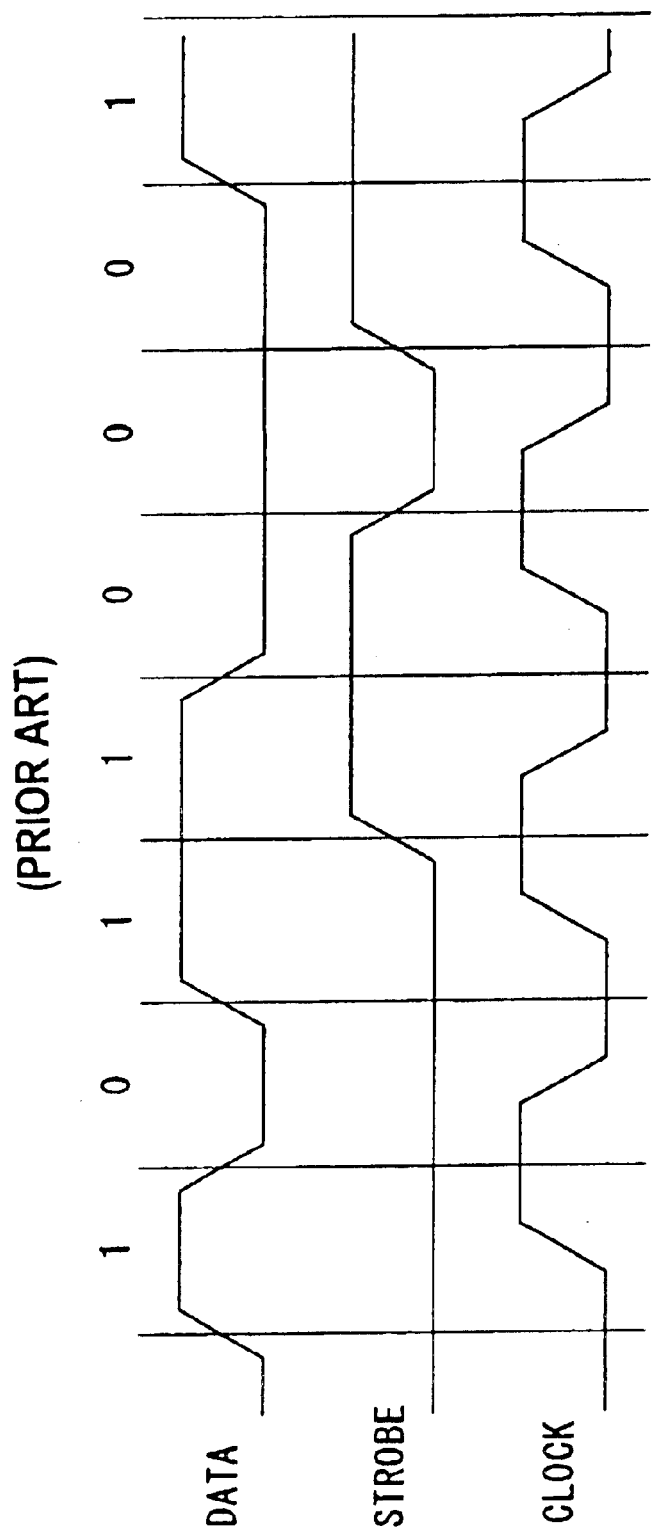
FIG. 1 is a diagram showing a structure of transmission data in compliance with the IEEE 1394 standard.
Figure 2:
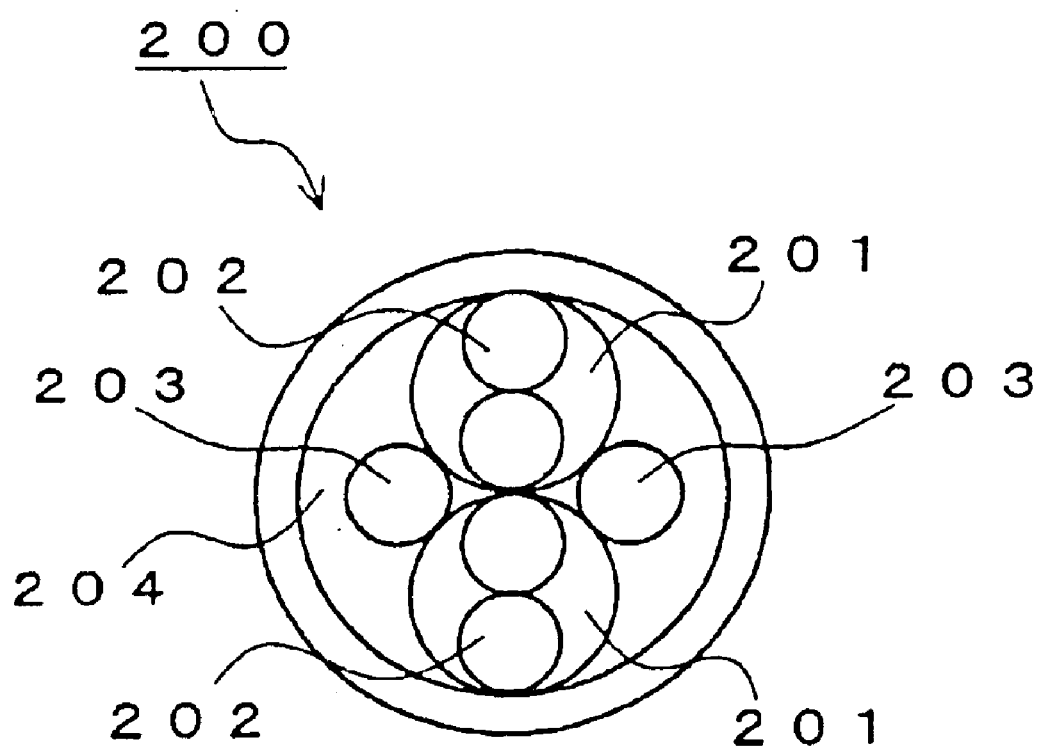
FIG. 2 is a cross-sectional view of a cable defined by the IEEE 1394 standard.
Figure 3A:
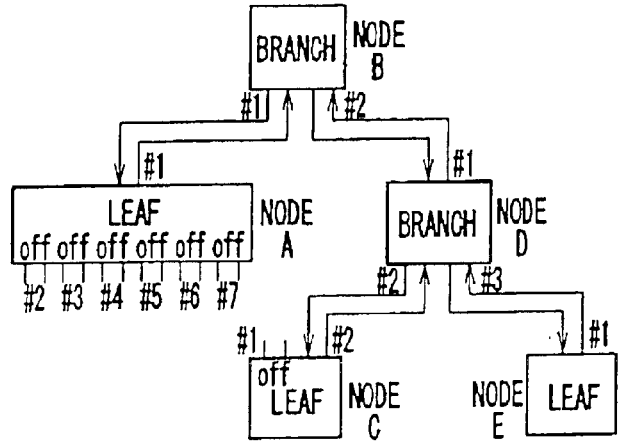
FIGS. 3A to 3C are diagrams showing a network constituted at the completion of bus initialization, tree identification, and self-identification.
Figure 3B:
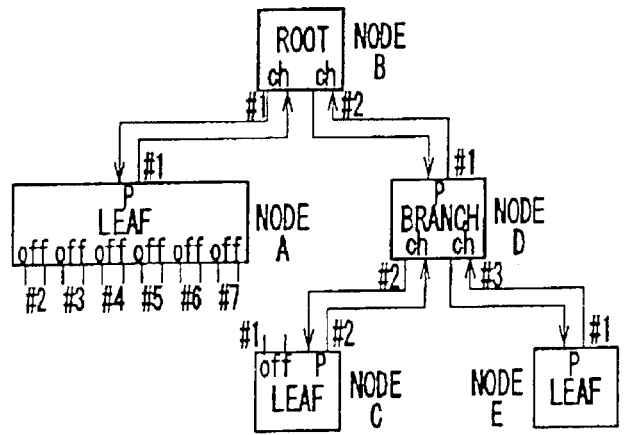
Figure 3C:
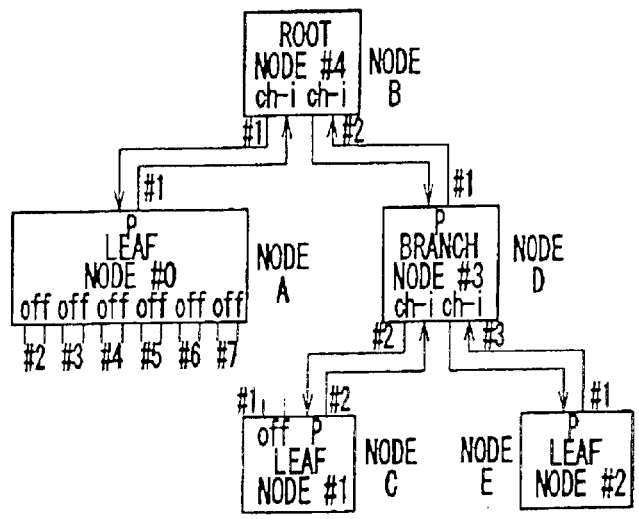

Hereinafter, embodiments of the present invention will be described in detail with reference to the drawings.

FIG. 10 is a diagram showing an exemplary structure of a network constituted based on the IEEE 1394 standard. A work station 10, a personal computer 11, a hard disc drive 12, a CD-ROM drive 13, a camera 14, a printer 15, and a scanner 16 together constitute an IEEE 1394 node, and are connected to each other via IEEE 1394 buses 20. There are two methods for connecting equipment in conformity with the IEEE 1394 standard: a daisy chain connection and a node multipoint connection. In the daisy chain connection method, a maximum of 16 nodes (i.e., equipment having an IEEE 1394 port) can be connected. A combination of the daisy chain connection method and the node multipoint connection method, as shown in FIG. 10, allows 63 nodes to be connected, which is the maximum number in the IEEE 1394 standard.

The IEEE 1394 standard allows cable connection/disconnection in the operating state of the equipment, that is, when the equipment is turned on. At the time when a node is added or deleted, the reconfiguration of the topology is conducted through the bus initialization phase, the tree identification phase, and the self-identification phase in this order, as described above. The identification and arrangement of the nodes connected to the network is controlled on the interface.

FIG. 11 is a diagram showing the constituent elements and the protocol architecture of an interface which conforms to the IEEE 1394 standard. The interface consists of both hardware and firmware.

The hardware consists of a physical layer (PHY) and a link layer. The physical layer directly drives a signal which conforms to the IEEE 1394 standard. The link layer includes a host interface and a physical layer interface.

The firmware consists of a transaction layer and a management layer. The transaction layer includes a management driver for performing an actual operation for the interface which conforms to the IEEE 1394 standard. The management layer includes a driver for managing a network, and is referred to as a serial bus management (SBM) and conforms to the IEEE 1394 standard. An application layer consists of software used by a user, and management software for interfacing the transaction layer and the management layer.

In the IEEE 1394 standard, transmission operations performed within the network are referred to as subactions, and the following two subactions are defined. One of the subactions is in a non-synchronous transmission mode referred to as an "asynchronous" mode, while the other is in a real-time transmission mode referred to as an "isochronous" mode in which the transmission band is secured. Each of the subactions is further categorized in three parts which assume the following states, respectively:

an arbitration state;
a packet transmission state; and
an acknowledgement state,
wherein the acknowledgement state is omitted from the "isochronous" mode.

In the subaction in the asynchronous mode, non-synchronous transmission is conducted. FIG. 12 is a diagram showing the transaction state with the lapse of time in the asynchronous transmission mode. In FIG. 12, the initial subaction gap indicates that the bus is in the idle state. The time during which the subaction gap lasts is monitored to judge whether the immediately preceding transmission has finished and another new transmission is possible.

If the idle state lasts for a specified period of time or longer, the node which wishes to conduct transmission judges that the bus is usable, and performs an arbitration for obtaining the bus. In an actual operation, the judgment whether or not to stop the bus is conducted by the node A located at the root, as shown in FIGS. 13A and 13B. After the node wishing the transmission obtains the right to use the bus in this arbitration, the node conducts transmission of the next data, that is, packet transmission. After the data transmission, the node which has received the data conducts acknowledgement in response to the data transmission by returning a data receipt acknowledgement return code (ack). The sending of the data receipt acknowledgement return code (ack) acknowledges that the transmission has been conducted normally in both the transmission node and the receiving node. After that, the state is returned to the subaction gap, that is, to the bus idle state, and the transmission operation as described above is repeated.

In the subaction in the isochronous mode, transmission is executed basically in the same manner as in the asynchronous mode, except that, as shown in FIG. 14, transmission in the isochronous subaction is assigned a higher priority and is executed prior to transmission in the asynchronous subaction. The isochronous transmission in the isochronous subaction is executed subsequent to the cycle start packet which is issued at about every 8 kHz (125 fÊs), and is assigned a higher priority to be executed prior to the asynchronous transmission in the asynchronous subaction. In this manner, the isochronous transmission is in a transmission mode in which the transmission band is secured, thereby attaining the transmission of the real-time data.

The cycle described above is created by a cycle start packet supplied from a node having a cycle master function (i.e., any equipment connected to the bus). In isochronous transmission, the band required for data transmission (although this is a unit of time, it is referred to as a band) is secured from the first portion of the cycle. Therefore, in isochronous transmission, data transmission within a specified period of time is assured. However, since isochronous transmission has no arrangement for data protection, the data is lost when transmission errors occur. On the other hand, in asynchronous transmission, the node sends the asynchronous packet when it has obtained the right to use the bus as a result of arbitration during the time when the bus is not used for isochronous transmission in each cycle. Reliable transmission is possible by using acknowledgement and retry; however, the transmission is not executed within a specified time.

Where a plurality of nodes execute real-time data transmission through isochronous transmission, the transmission data is provided with a channel ID for identifying its content (i.e., transmission node), so that only required real-time data is received.

In order to allow a predetermined node to execute isochronous transmission, it is required that the node has an isochronous function. In addition, at least one of the nodes having an isochronous function must also have a cycle master function. Furthermore, at least one of the nodes connected to the IEEE 1394 serial bus must have an isochronous resource managing function.

Figure 15:
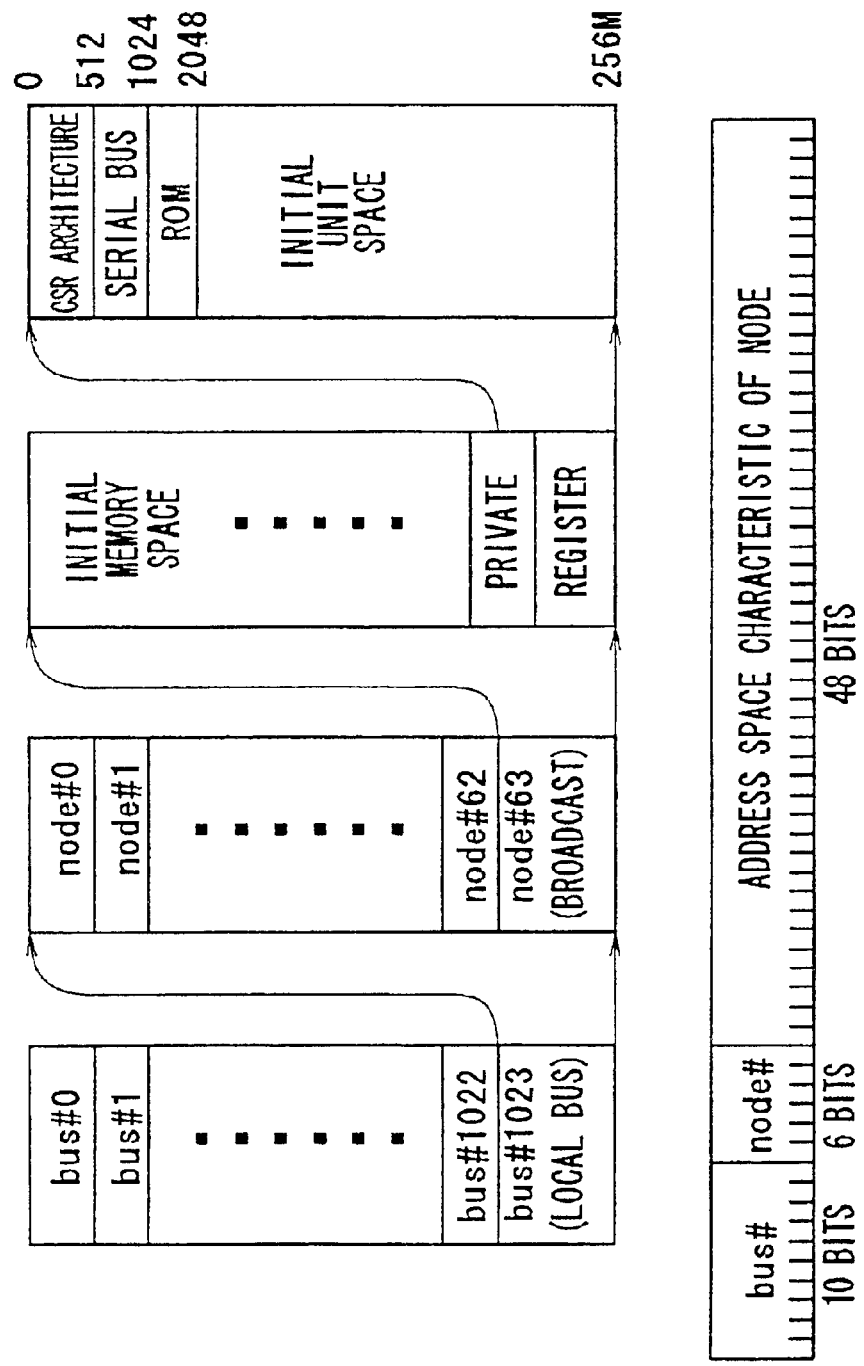
FIG. 15 is a diagram showing address designation in a CSR architecture.

The address space defined in the IEEE 1394 standard has a structure such as shown in FIG. 15. This structure conforms to the CSR (Control & Status Register) architecture defined by the ISO/IEC13213 standard for 64-bit fixed addressing (hereinafter referred to as a "CSR architecture"). As shown in FIG. 12, the first 16 bits in each address indicate a node ID for providing an address space to the node. The node ID designates the bus ID by its first 10 bits, and designates the physical ID (i.e., a node ID in a narrow sense) by its next 6 bits. The bus ID and the physical ID use the value obtained when all bits are set to 1 for a special purpose. Therefore, this addressing method enables 1023 buses and nodes each capable of designating 63 individual addresses to be specified.

In the remaining 48 bits of the address space defining 256 terabytes, the space defined by the first 20 bits is divided into an initial register space which is used for a register unique to a 2048 byte CSR and a register unique to the IEEE 1394 standard, a private space, and an initial memory space. The space defined by the remaining 28 bits is used, when the space defined by the first 20 bits is an initial register space, as a configuration read only memory (ROM), an initial unit space for a use specific to the node, plug control register (PCRs), or the like.

FIG. 16 is a diagram illustrating offset addresses, names, and operations of the main CSRs. The term "offset" in FIG. 16 shows the offset address relative to the FFFFF0000000h address (the h at the rearmost end indicates that the address is in a hexadecimal notation) at which the initial register space begins. The bandwidth available register having an offset of 220h indicates a bandwidth which can be allocated to isochronous transmission, and recognizes only the value of the node operating as an isochronous resource manager to be effective. Specifically, while each node has a CSR architecture such as shown in FIG. 15, the bandwidth available register in only the isochronous resource manager is recognized to be effective. In other words, it is only the isochronous resource manager that actually has the bandwidth available register. In the bandwidth available register, a maximum value is stored when no bandwidth has been allocated to isochronous transmission, and the value thereof is reduced every time a bandwidth is allocated to isochronous transmission.

The channels available registers from offset 224h to 228h correspond to channel numbers with 0 to 63 bits, respectively. A channel number with 0 bits means that the channel has already been allocated to the channels available register. The channel available register is effective only in the node operating as an isochronous resource manager.

Figures 17, 19:
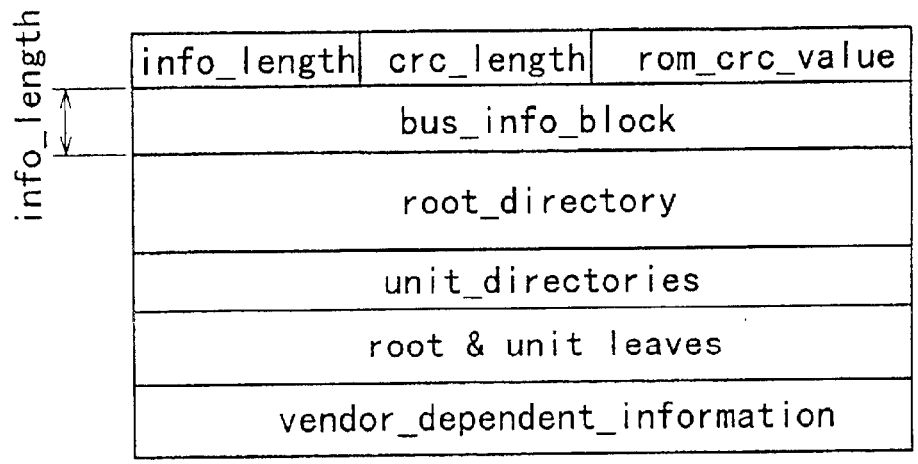
FIG. 17 is an explanatory diagram showing an example of a general ROM format.
FIG. 19 is an explanatory diagram showing an example of the structure of PCRs.

Referring again to FIG. 15, a configuration read only memory (ROM) based on a general read only memory (ROM) format is arranged in the addresses 200h to 400h within the initial unit space. FIG. 17 is a diagram for illustrating the general ROM format. The node, which is a unit of access in the IEEE 1394 standard, can hold a plurality of units capable of operating independently while having the common address space in the node. The unit directories field can indicate the version and the position of the software for the unit. The bus info block and the root directory are located at fixed positions, and the other blocks are located at positions designated by the offset addresses.

FIG. 18 is a diagram showing the bus info block, root directory, and unit directory in detail. An ID number indicating the manufacturer of the apparatus is stored in the company ID field in the bus info block. An ID which is unique to that apparatus and which is the only one ID in the world which does not overlap other IDs is stored in the chip ID field. 00h is written into the first octet of the unit spec ID field of the unit directory of apparatus satisfying the requirements of the IEC 61883 standard, Aoh is written into the second octet thereof, and 2Dh is written into the third octet thereof. Furthermore, 01h is written in the first octet of the unit switch version field, and 1 is written into the least significant bit (LSB) of the third octet.

The node has a plug control register (PCR) defined by the IEC61883 standard in the addresses 900h to 9FFh within the initial unit space shown in FIG. 15, in order to control input/output of an apparatus via an interface. This design embodies the concept of plug substantiated to form a signal path logically similar to an analog interface. FIG. 19 is a diagram for illustrating the structure of a PCR. The PCR has an output plug control register (oPCR) indicating an output plug, and an input plug control register (iPCR) indicating an input plug. The PCR also has an output master plug register (oMPR) and an input master plug register (iMPR) for indicating information on the output plug or the input plug specific to each device. Each device does not have a plurality of oMPRs or iMPRs, but may have, depending on its ability, a plurality of oPCRs or iPCRs corresponding to individual plugs thereof. Each of the PCRs shown in FIG. 19 has 31 oPCRs and 31 iPCRs. The isochronous data flow is controlled by manipulating the registers corresponding to these plugs.

FIGS. 20A to 20D are diagrams showing the structures of an oMPR, oPCR, iMPR, and iPCR, respectively. FIG. 20A shows the structure of an oMPR, FIG. 20B shows the structure of an oPCR, FIG. 20C shows the structure of an iMPR, and FIG. 20D shows the structure of an iPCR. A code indicating the maximum transmission rate of isochronous data which the device can send or receive is stored in the 2 bit data rate capability field on the MSB side of each of the oMPR and iMPR. A broadcast channel base field in the oMPR defines the channel number to be used for broadcast output.

The number of output plugs that the device has, that is, a value showing the number of oPCRs, is stored in the 5 bit number of output plugs field on the LSB side of the oMPR. The number of input plugs that the device has, that is, a value showing the number of iPCRs, is stored in the 5 bit number of input plugs field on the LSB side of the iMPR. A non-persistent extension field and a persistent extension field are regions defined for future expansion.

An on-line field on the MSB side of both the oPCR and the iPCR indicates a state of use of a plug. Specifically, a value of 1 in the on-line field means that the plug is in an on-line state, and a value of 0 in the on-line field means that the plus is in an off-line state. The values in the broadcast connection counter fields of both the oPCR and iPCR indicate the presence (a value of 1) or absence (a value of 0) of a broadcast connection. The value in the 6 bit point-to-point connection counter fields in both the oPCR and iPCR indicate the number of point-to-point connections that the plug has.

The values in the 6 bit channel number fields in both the oPCR and iPCR indicate the isochronous channel number to which the plug is to be connected. The value in the 2 bit data rate field in the oPCR indicates an actual transmission rate of the packets of isochronous data to be output from the plug. The code stored in the 4 bit overhead ID field in the oPCR indicates the bandwidth over the isochronous communication. The value in the 10 bit payload field in the oPCR indicates the maximum value of the data contained in the isochronous packets that can be handled by the plug.

Figure 21:
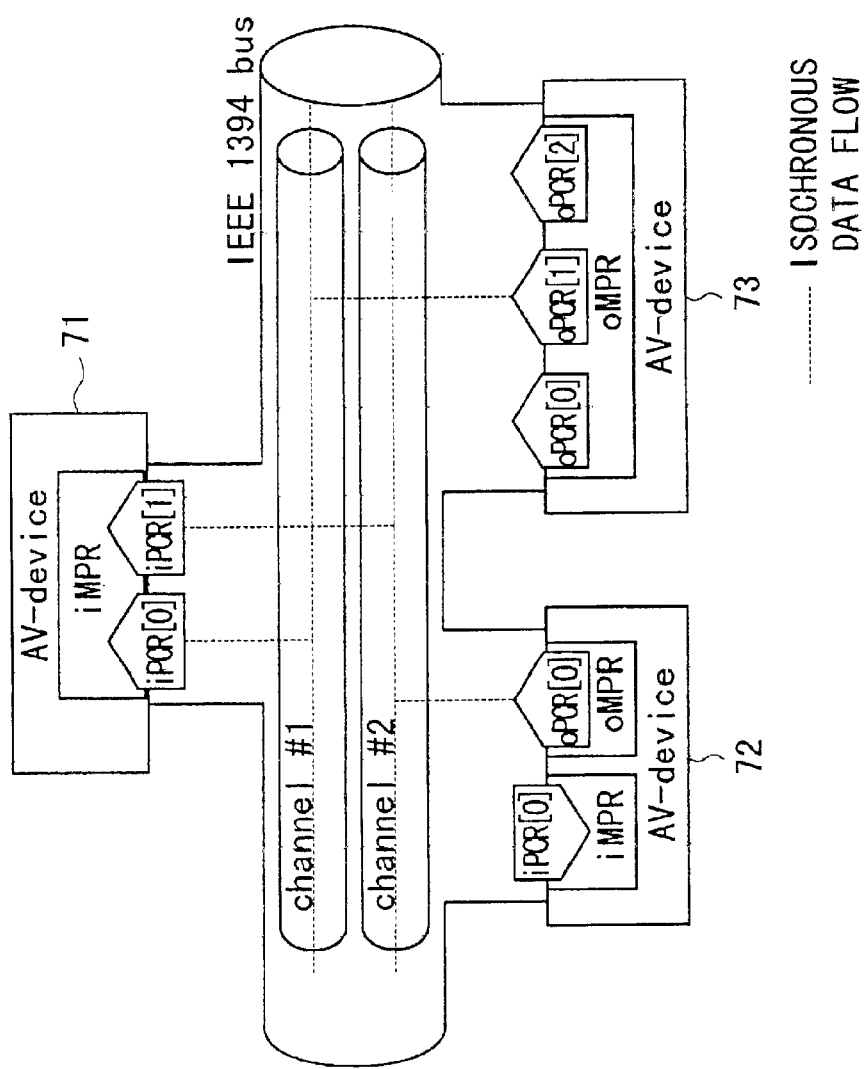
FIG. 21 is an explanatory diagram showing an exemplary relationship between a plug, a plug control register, and a transmission channel.

FIG. 21 is a diagram showing the relationship among a plug, a plug control register, and an isochronous channel. AV devices 71 to 73 are connected to each other by an IEEE 1394 serial bus. The oMPR in the AV device 73 defines the number and transmission rate of the oPCR[0] to oPCR[2] in the device. The isochronous data for which the channel is designated by the oPCR [1] is sent to channel #1 in the IEEE 1394 serial bus. The iMPR in the AV device 71 defines the number and transmission rate of the iPCR[0] and iPCR[1] therein. The AV device 71 reads the isochronous data sent to channel #1 in the IEEE 1394 serial bus as designated by the iPCR[0]. Similarly, the AV device 72 sends isochronous data to channel #2 as designated by the oPCR[0]. The AV device 71 reads the isochronous data from channel #2 as designated by the iPCR[1].

In the aforementioned manner, data transmission is executed among the devices connected to each other by the IEEE 1394 serial bus. In this structure, each device can be controlled and the state thereof can be determined by use of an AV/C command set defined as commands for controlling the devices connected to each other by the IEEE 1394 serial bus. Hereinafter, the AV/C command set will be described.

Figure 22:
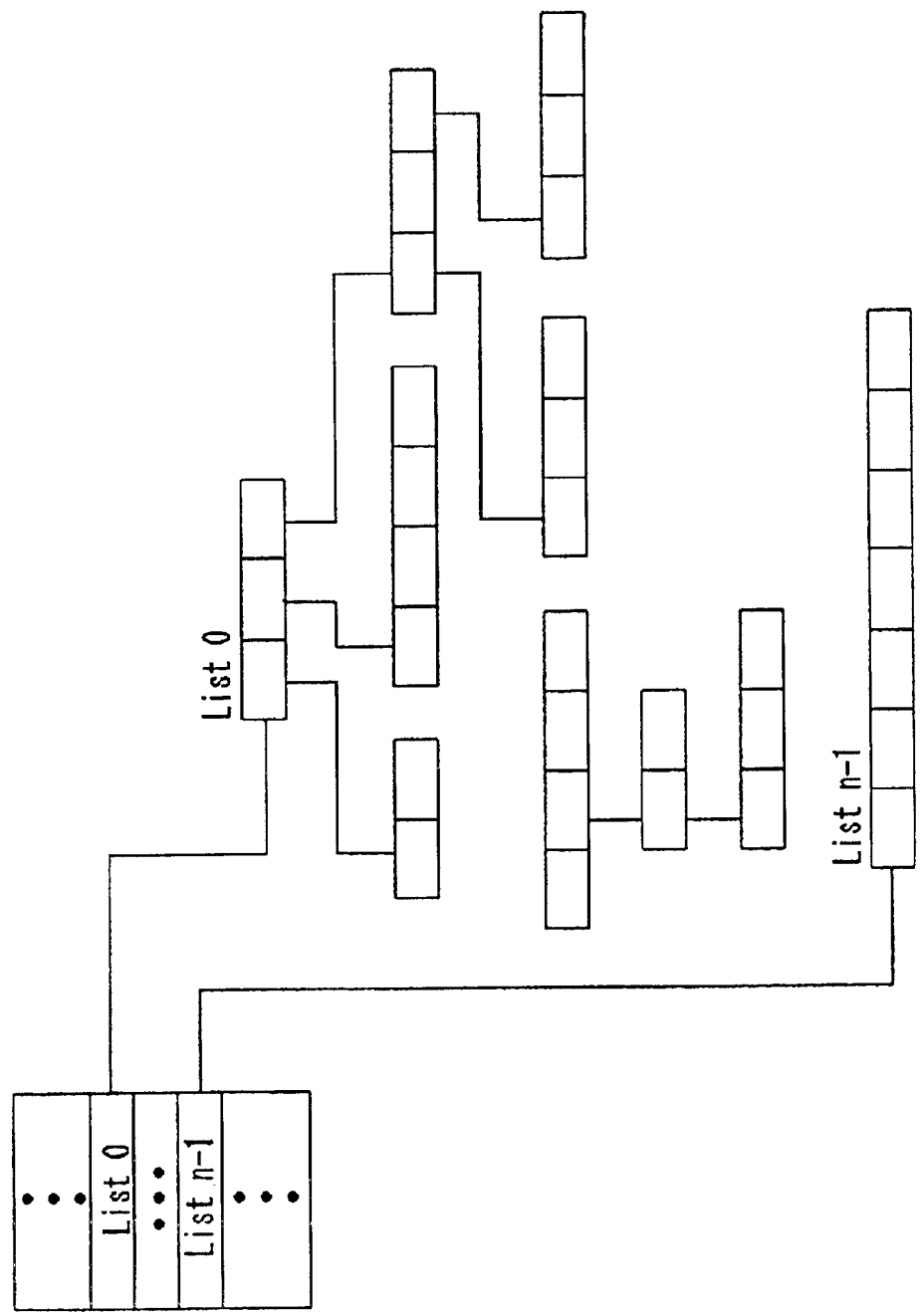
FIG. 22 is an explanatory diagram showing an example of a data structure in a hierarchy of a descriptor.

First, a data structure of the subunit identifier descriptor in the AV/C command set will be described with reference to FIGS. 22 to 25. FIG. 22 is a diagram showing the data structure of the subunit identifier descriptor. As seen in FIG. 22, the data structure of the subunit identifier descriptor consists of hierarchical lists. In the case of a tuner, for example, a list represents channels through which data can be received, and, in the case of a disc, for example, a list represents music recorded thereon. The uppermost list in the hierarchy is referred to as a root list, and list 0 is a root for the lists at lower positions, for example. Similarly, the lists 2 to (n−1) are also root lists. There are as many root lists as there are objects. The term "object" means, in the case where the AV device is a tuner, each channel in a digital broadcast. All the lists in one hierarchy share the same information.

FIG. 23 is a diagram showing a format of the general subunit identifier descriptor. The subunit identifier descriptor has contents including attribute information as to functions. It does not include a value of the descriptor length field itself. The generation ID field indicates the AV/C command set version, and its value is at "00h" (the h designates that this value is in hexadecimal notation) at present, as shown in FIG. 24. A value at "00h" means that the data structure and the command set are version 3.0 of AV/C general specification. In addition, as shown in FIG. 24, all the values except for "00h" are reserved for future specification.

The size of list ID field shows the number of bytes of the list ID. The size of object ID field shows the number of bytes of the object ID. The size of object position field shows the position (i.e., the number of bytes) in the lists to be referenced in a control operation. The number of root object lists field shows the number of root object lists. The root object list ID field shows an ID for identifying the uppermost root object list in the independent layers in the hierarchy.

The subunit dependent length field indicates the number of bytes in a subsequent subunit dependent information field. The subunit dependent information field shows information specific to the functions. The manufacturer dependent length field shows the number of bytes in the subsequent manufacturer dependent information field. The manufacturer dependent information field shows specification information supplied by a vender (i.e., manufacturer).

When the descriptor has no manufacturer dependent information, the manufacturer dependent information field does not exist.

FIG. 25 is a diagram showing the list ID assignment ranges shown in FIG. 23. As shown in FIG. 25, the values at "0000h to 0FFFh" and "4000n to FFFFh" are reserved for future specification. The values at "1000h to 3FFFh" "and 10000h to max list ID value" are prepared for identifying dependent information about function type.

Figure 26:
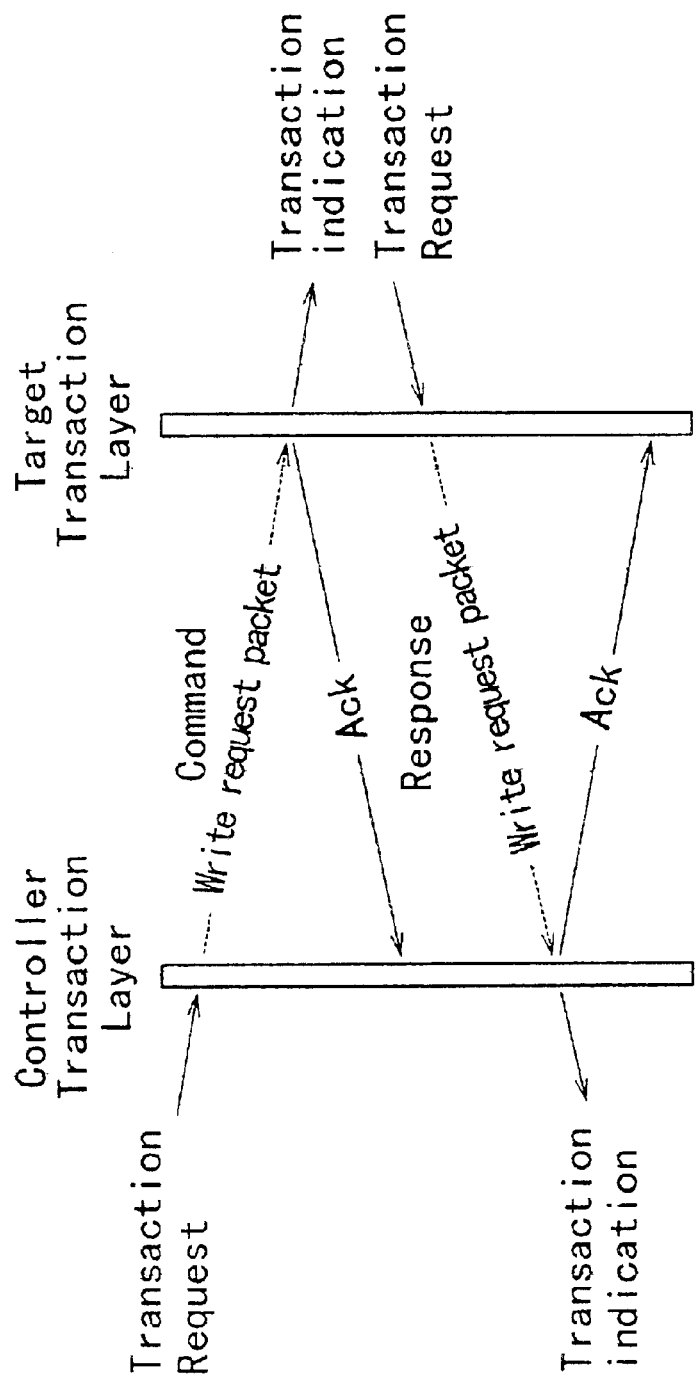
FIG. 26 is an explanatory diagram showing a relationship between the command and the response of FCP.

Next, the AV/C command set will be described with reference to FIGS. 26 to 30B. FIG. 26 is a diagram for illustrating the command and the response of the function control protocol (FCP) 85 of FIG. 27. The FCP is a protocol for controlling the AV device in conformity with the IEEE 1394 standard. As shown in FIG. 26, a controller is a control side, and a target is a side to be controlled. In the FCP, a command is transmitted and received between nodes by use of the write transaction in the IEEE 1394 asynchronous transmission. Upon receiving data from the controller, the target returns an acknowledgement to the controller to confirm receipt.

Figure 27:
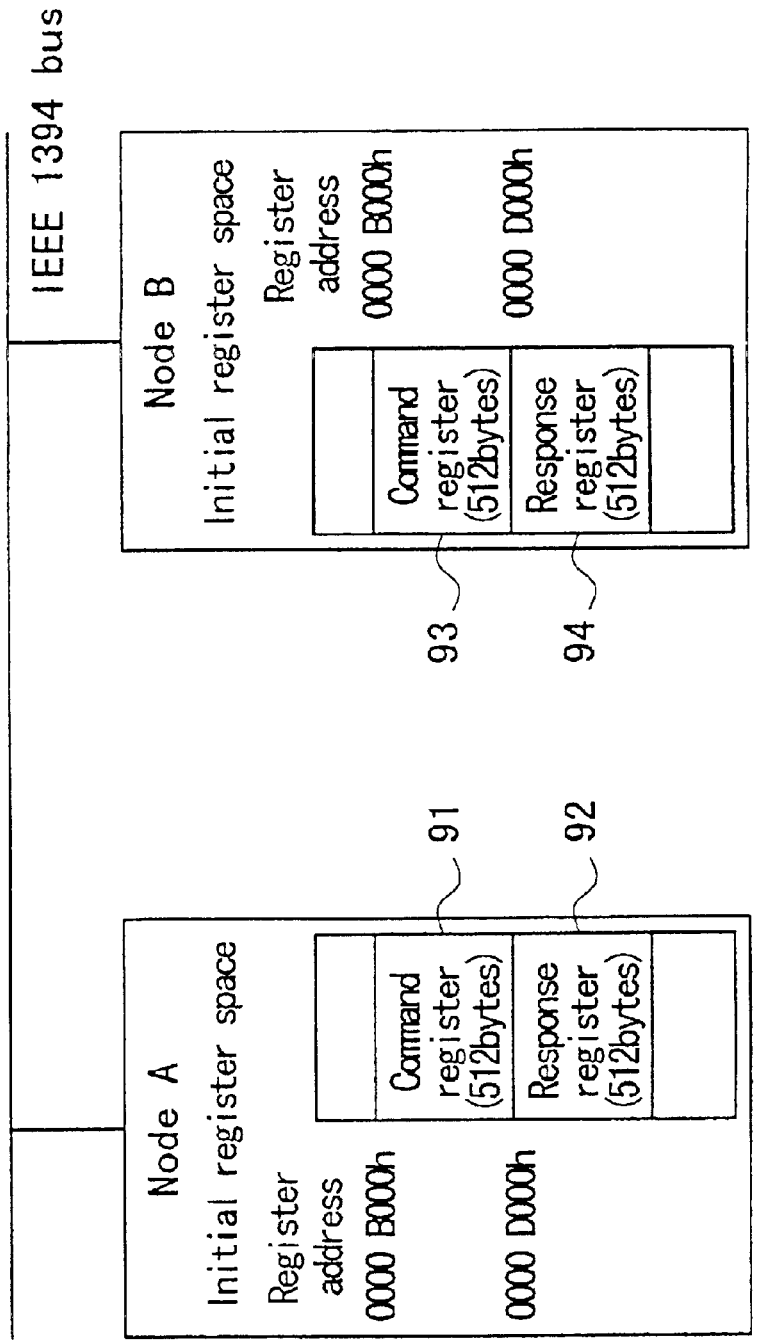
FIG. 27 is an explanatory diagram showing the relationship between the command and the response of FIG. 26 in more detail.

FIG. 27 is a diagram for further illustrating the relationship between a command and a response of the FCP shown in FIG. 26. A node A is connected with a node B via an IEEE 1394 bus. Node A is a controller, and node B is a target. Both node A and node B have a command register and a response register, each with 512 bytes. As shown in FIG. 27, the controller writes a command message into the command register 93 in the target to convey a command thereto. Contrarily, the target writes a response message into the response register 92 in the controller to convey a response thereto. Between these two messages, control information is exchanged. The type of the command set sent in the FCP is written in the CTS in a data field shown in FIG. 28.

Figure 28:
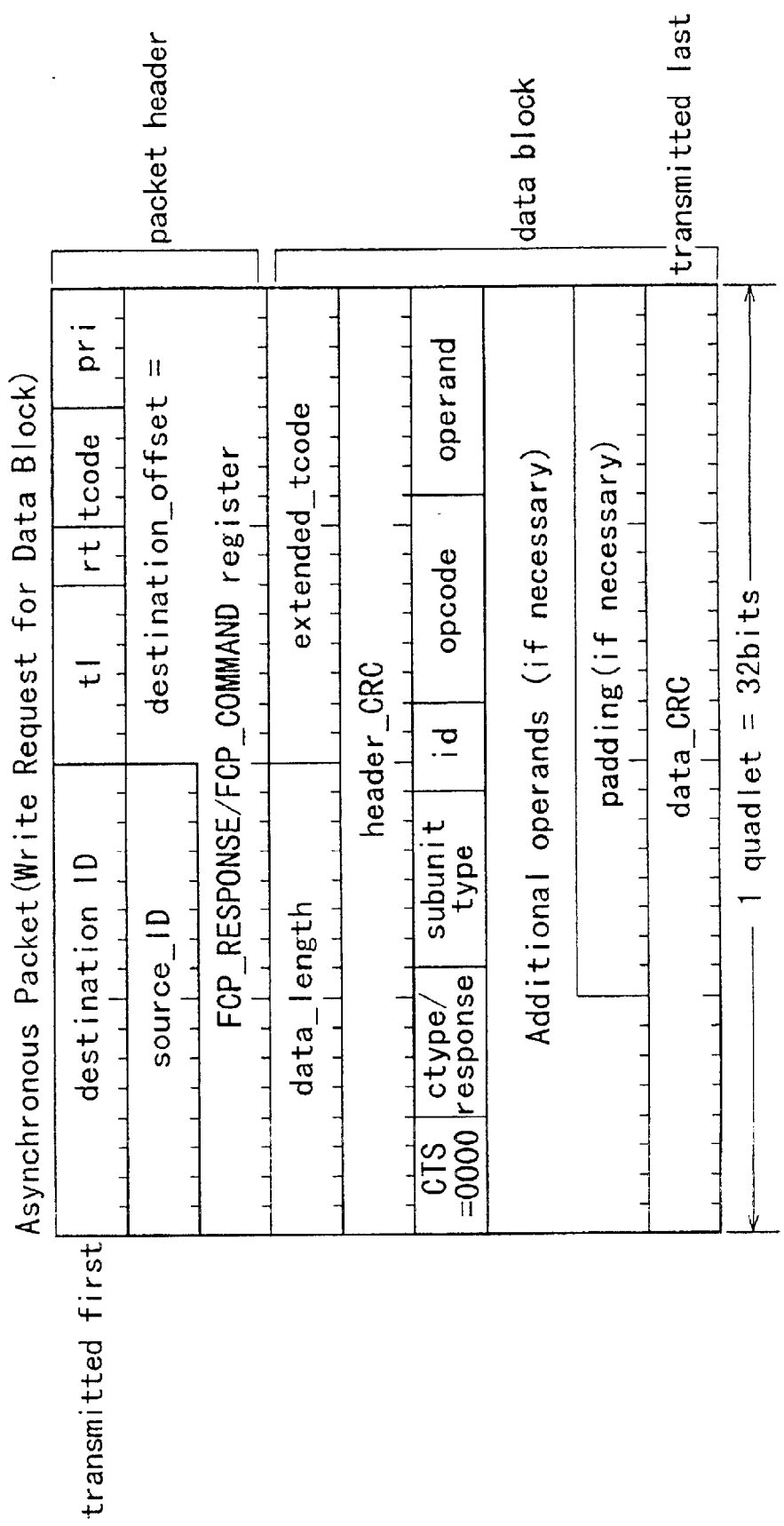
FIG. 28 is an explanatory diagram showing an exemplary data structure of an AV/C command.

FIG. 28 is a diagram showing the data structure of a packet of the AV/C command to be transmitted in the asynchronous transmission. The AV/C command set is a command set for controlling an AV device where the CTS (i.e., a command set ID)="0000". An AV/C command frame and a response frame are exchanged between nodes by use of the FCP described above. In order to prevent burdening the bus and the AV device, the time for responding to the command is limited to 100 ms. As shown in FIG. 28, the asynchronous packet data consists of 32 bits in a horizontal direction (i.e., 1 quadlet). A header of the packet is shown in the upper half of FIG. 28, and a data block is shown in the lower half of FIG. 28. The destination_ID field indicates a destination.

The CTS field shows the command set ID, wherein CTS="0000" for the AV/C command set. The ctype/response field indicates the function classification of a command when the packet is a command, and indicates the results of command processing when the packet is a response. Commands are roughly classified into four categories as follows: (1) a command for controlling a function from the outside (CONTROL); (2) a command for inquiring as to the state from the outside (STATUS); (3) a command for inquiring as to whether there is support for a control command from the outside (GENERAL INQUIRY for inquiring as to whether there is support for opcode, and SPECIFIC INQUIRY for inquiring as to whether there is support for opcode and operands); and (4) a command for requesting notification to the outside as to a change in state (NOTIFY).

What response is returned depends on the kind of the command. Responses to a CONTROL command are NOT IMPLEMENTED, ACCEPTED, REJECTED and INTERIM. Responses to a STATUS command are NOT IMPLEMENTED, REJECTED, IN TRANSITION and STABLE. Responses to a GENERAL INQUIRY command and a SPECIFIC INQUIRY command are IMPLEMENTED and NOT IMPLEMENTED. Responses to a NOTIFY command are NOT IMPLEMENTED, REJECTED, INTERIM and CHANGED.

The subunit type field specifies the function of the device, and is assigned to identify a tape recorder/player, a tuner, and the like. In order to distinguish each subunit from the others in the case where a plurality of subunits of the same kind exist, the subunit type executes addressing by use of a subunit ID as an identification number. The opcode field shows a command, and the operand field shows a parameter of the command. The additional operands fields are added if necessary. The padding field is also added if necessary. The data cyclic redundancy check (CRC) field is used for an error check in data transmission.

FIGS. 29A to 29C are diagrams showing specific examples of AV/C commands. FIG. 29A shows a specific example of the ctype/response field. The upper half of FIG. 29A shows commands, while the lower half of FIG. 29A shows responses. The value at "0000" is assigned with the CONTROL command, the value at "0001" is assigned with the STATUS command, the value at "0010" is assigned with the SPECIFIC INQUIRY command, the value at "0011" is assigned with the NOTIFY command, and the value at "0100" is assigned with the GENERAL INQUIRY command. The values at "0101" to "0111" are reserved for future specification. In addition, the value at "1000" is assigned with the NOT IMPLEMENTED response, the value at "1001" is assigned with the ACCEPTED response, the value at "1010" is assigned with the REJECTED response, the value at "1011" is assigned with the IN TRANSITION response, the value at "1100" is assigned with the IMPLEMENTED/STABLE response, the value at "1101" is assigned with the CHANGED response, and the value at "1111" is assigned with the INTERIM response. The value at "1110" is reserved for future specification.

FIG. 29B shows a specific example of the subunit type field. The value at "00000" is assigned with a video monitor, the value at "00011" is assigned with a disk recorder/player, the value at "00100" is assigned with a tape recorder/player, the value at "00101" is assigned with a tuner, the value at "00111" is assigned with a video camera, the value at "11100" is assigned with a vendor unique device, the value at "11110" is assigned to indicate that the subunit type is extended to the next byte. The value at "11111" is assigned with a unit, and is used for transmitting data to a device itself, for example, for turning on and off the electric power to the device.

FIG. 29C shows a specific example of the opcode field. Each subunit type has its own opcode table, and FIG. 29C shows the opcode table in the case where the subunit type is a tape recorder/player. In addition, an operand is defined for each opcode. In the example of FIG. 29C, the value at "00h" is assigned with VENDOR-DEPENDENT, the value at "50h" is assigned with SEARCH MODE, the value at "51h" is assigned with TIMECODE, the value at "52h" is assigned with ATN, the value at "60h" is assigned with OPEN MIC, the value at "61h" is assigned with READ MIC, the value at "62h" is assigned with WRITE MIC, the value at "C1h" is assigned with LOAD MEDIUM, the value at "C2h" is assigned with RECORD, the value at "C3h" is assigned with PLAY, and the value at "C4h" is assigned with WIND.

FIGS. 30A and 30B show specific examples of an AV/C command and response. For example, when an instruction for executing reproduction is provided to a reproducing device as a target (consumer), the controller sends a command such as shown in FIG. 30A to the target. Since this command uses the AV/C command set, the CTS is at the value of "0000". Since the command for controlling the device from the outside (CONTROL) is used for the ctype, the ctype is at the value of "0000" (see FIG. 29A). Since the subunit type is a tape recorder/player, the subunit type is at the value of "00100" (see FIG. 29B). The id shows the case of ID0, wherein the id is at the value of "000". The opcode is at the value of "C3h" which means play (reproduce) (see FIG. 29C). The operand is at the value of "75h" which means FORWARD. When reproduced, the target returns a response to the controller, such as shown in FIG. 30B. In the example shown in FIG. 30B, "accepted", meaning that the data has been received, is part of the response and, therefore, the response is at the value of "1001" (see FIG. 29A). Except for the response, the other configurations of FIG. 30B are basically the same as in FIG. 30A and, therefore, their descriptions will be omitted.

Figure 31:
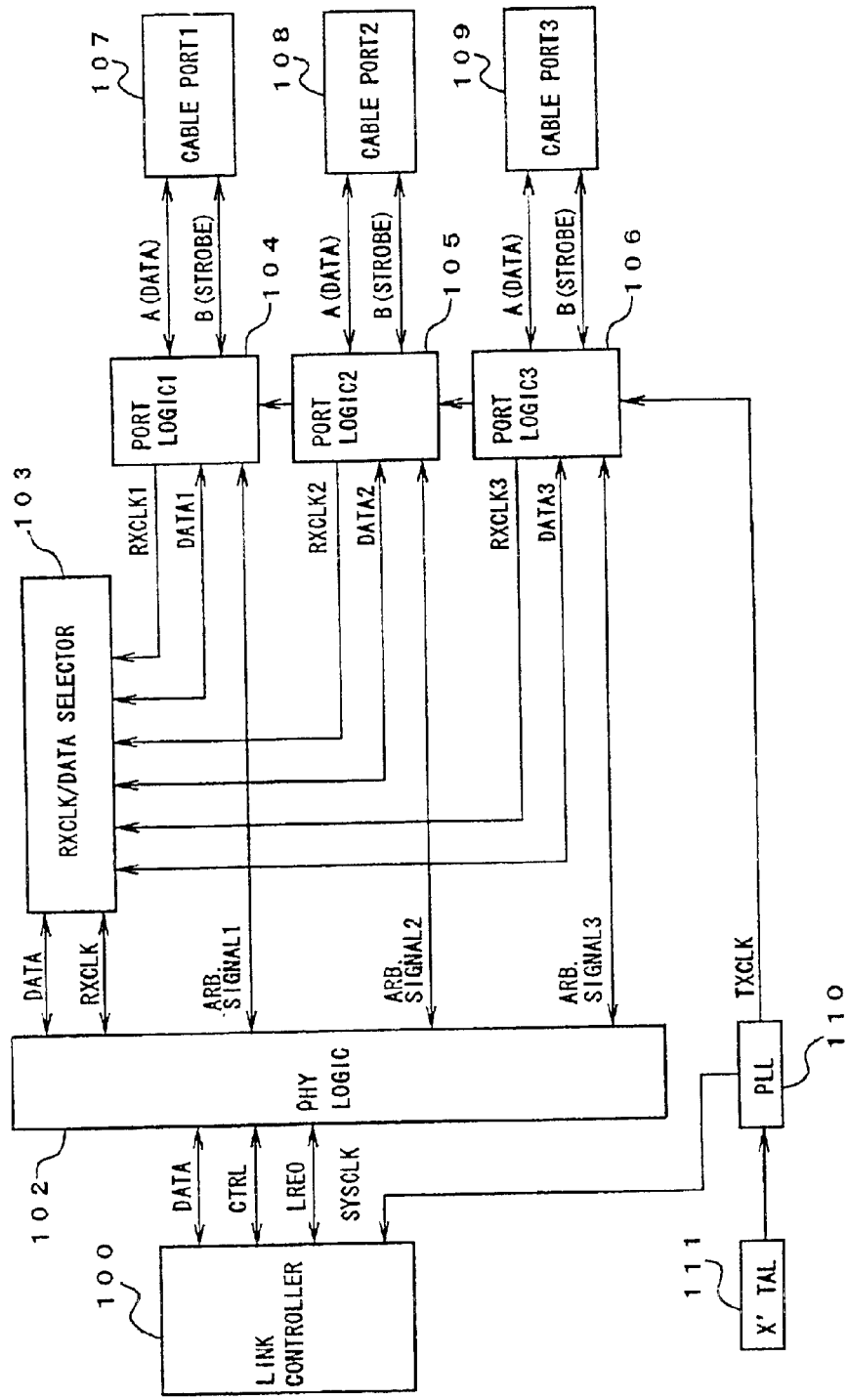
FIG. 31 is a block diagram showing an exemplary structure of a physical layer.

The physical layer which conforms to the IEEE 1394 standard described above, as shown in FIG. 31 for example, includes: a physical layer logical block (PHY LOGIC) 102; a selector block (RXCLOCK/DATA SELECTOR) 103; port logical blocks (PORT LOGIC 1, PORT LOGIC 2, and PORT LOGIC 3) 104, 105, and 106, respectively; cable ports (CABLE PORT 1, CABLE PORT 2, CABLE PORT 3) 107, 108, and 109, respectively; and a clock generation block (PLL) 110.

The physical layer logical block 102 executes input-output (I/O) control and arbitration control between the physical layer and the link layer defined by the IEEE 1394 standard. The physical layer logical block 102 is connected to a link layer controller 100, and also is connected to the selector block 103, and each of the port logical blocks 104, 105, and 106.

The selector block 103 selects one pair from: DATA 1 data which it receives via the logical block 104 connected to the cable port 107, and the receive clock RXCLK 1 thereof; DATA 2 data which it receives via the logical block 105 connected to the cable port 108, and the receive clock RXCLK 2 thereof; and DATA 3 data which it receives via the logical block 106 connected to the cable port 109, and the receive clock RXCLK 3 thereof. The selector block 103 is connected to the physical layer block 102 and each of the port logical blocks 104, 105, and 106.

When transmitting data, the selector block 103 transmits packet data DATA, which has been received from the physical layer logical block 102, to all the port logical blocks 104, 105, and 106. When receiving data, the selector block 103 selects one pair from: DATA 1 data which it receives via the port logical block 104, and the receive clock RXCLK 1 thereof; DATA 2 data which it receives via the port logical block 105, and the receive clock RXCLK 2 thereof; and DATA 3 data which it receives via the port logical block 106, and the receive clock RXCLK 3 thereof. The selector block 103 then sends the selected pair, for example, the DATA 1 data and the receive clock RXCLK 1 thereof, to the physical layer logical block 102. The packet data selected by the selector block 103, for example, the DATA 1 data received via the port logical block 104, is written into a FIFO memory within the physical layer logical block 102 by use of its receive clock RXCLK 1. The packet data written into the FIFO memory is read by a system clock SYSCLK which is provided from the clock generation block 110.

The port logical block 104 transmits and receives an arbitration signal ARB 1 and DATA 1 data via the cable port 107, and has a function of producing a receive clock RXCLK 1 from the data transmitted via the cable port 107 and a strobe signal thereof. When arbitration is conducted, an arbitration signal ARB 1 is sent to the port logical block 104 from the physical layer logical block 102.

In transmitting data, the port logical block 104 converts the DATA 1 data sent from the physical layer logical block 102 via the selector block 103 into serial data by use of a transmission clock TXCLK provided from the clock generation block 110. Then, the port logical block 104 transmits the resultant serial data through the cable port 107.

In receiving data, the port logical block 104 transmits the DATA 1 data, which it has received via the cable port 107, together with the receive clock RXCLK 1 thereof, to the physical layer logical block 102 via the selector block 103. In the case where the port logical block 104 is selected by the selector block 103, the DATA 1 data is written into the FIFO memory within the physical layer logical block 102 by use of the receive clock RXCLK 1 thereof.

The port logical block 105 transmits and receives an arbitration signal ARB 2 and DATA 2 data via the cable port 108, and has a function of producing a receive clock RXCLK 2 from the data transmitted via the cable port 108 and a strobe signal thereof. When arbitration is conducted, an arbitration signal ARB 2 is sent to the port logical block 105 from the physical layer block 102.

In transmitting data, the port logical block 105 converts the DATA 2 data sent from the physical layer logical block 102 via the selector block 103 into serial data by use of a transmission clock TXCLK provided from the clock generation block 110. Then, the port logical block 105 transmits the resultant serial data through the cable port 108.

In receiving data, the port logical block 105 transmits the DATA 2 data, which it has received via the cable port 108, together with the receive clock RXCLK 2 thereof, to the physical layer logical block 102 via the selector block 103. In the case where the port logical block 105 is selected by the selector block 103, the DATA 2 data is written into the FIFO memory within the physical layer logical block 102 by use of the receive clock RXCLK 2 thereof.

The port logical block 106 transmits and receives an arbitration signal ARB 3 and DATA 3 data via the cable port 109, and has a function of producing a receive clock RXCLK 3 from the data transmitted via the cable port 109 and a strobe signal thereof. When arbitration is conducted, an arbitration signal ARB 3 is sent to the port logical block 106 from the physical layer logical block 102.

In transmitting data, the port logical block 106 converts the DATA 3 data sent from the physical layer logical block 102 via the selector block 103 into serial data by use of a transmission clock TXCLK provided from the clock generation block 110. Then, the port logical block 106 transmits the resultant serial data through the cable port 109.

In receiving data, the port logical block 106 transmits the DATA 3 data, which it has received via the cable port 109, together with the receive clock RXCLK 3 thereof, to the physical layer logical block 102 via the selector block 103. In the case where the port logical block 106 is selected by the selector block 103, the DATA 3 data is written into the FIFO memory within the physical layer logical block 102 by use of the receive clock RXCLK 3 thereof.

The cable port 107 drives a twisted pair cable by use of a signal transmitted from the port logical block 104. In addition, the cable port 107 converts the level of the signal sent thereto via the twisted pair cable, and sends the resultant signal to the port logical block 104.

The cable port 108 drives a twisted pair cable by use of a signal transmitted from the port logical block 105. In addition, the cable port 108 converts the level of the signal sent thereto via the twisted pair cable, and sends the resultant signal to the port logical block 105.

The cable port 109 drives a twisted pair cable by use of a signal transmitted from the port logical block 106. In addition, the cable port 109 converts the level of the signal sent thereto via the twisted pair cable, and sends the resultant signal to the port logical block 106.

The clock generation block 110 generates a 49.152 MHz system clock SYSCLK and a 98.304 MHz transmission clock TXCLK from a 24.576 MHz clock provided form a quartz oscillator 111.

Figure 4:
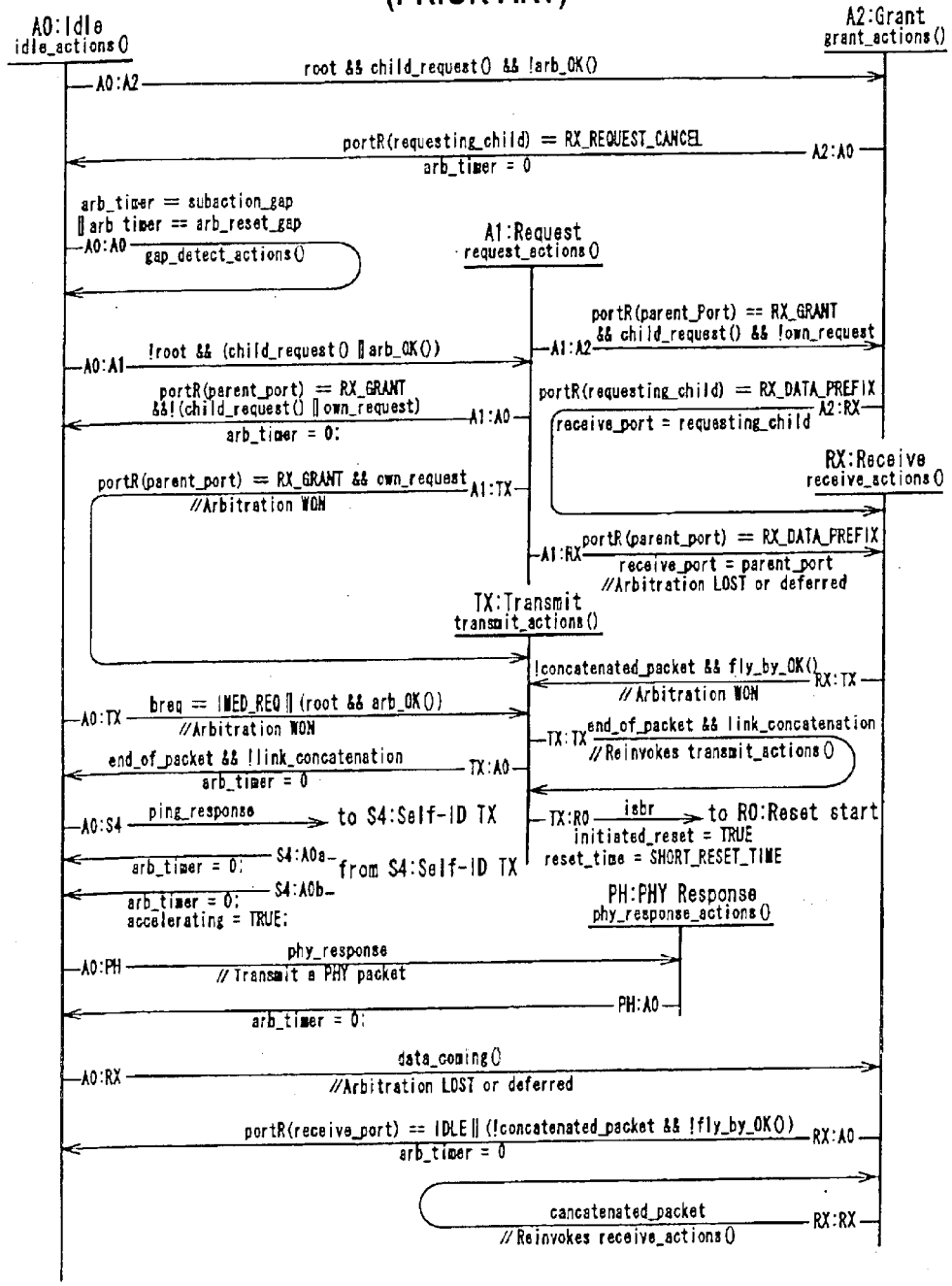
FIG. 4 is a transition diagram at an arbitration phase.
Figure 5:
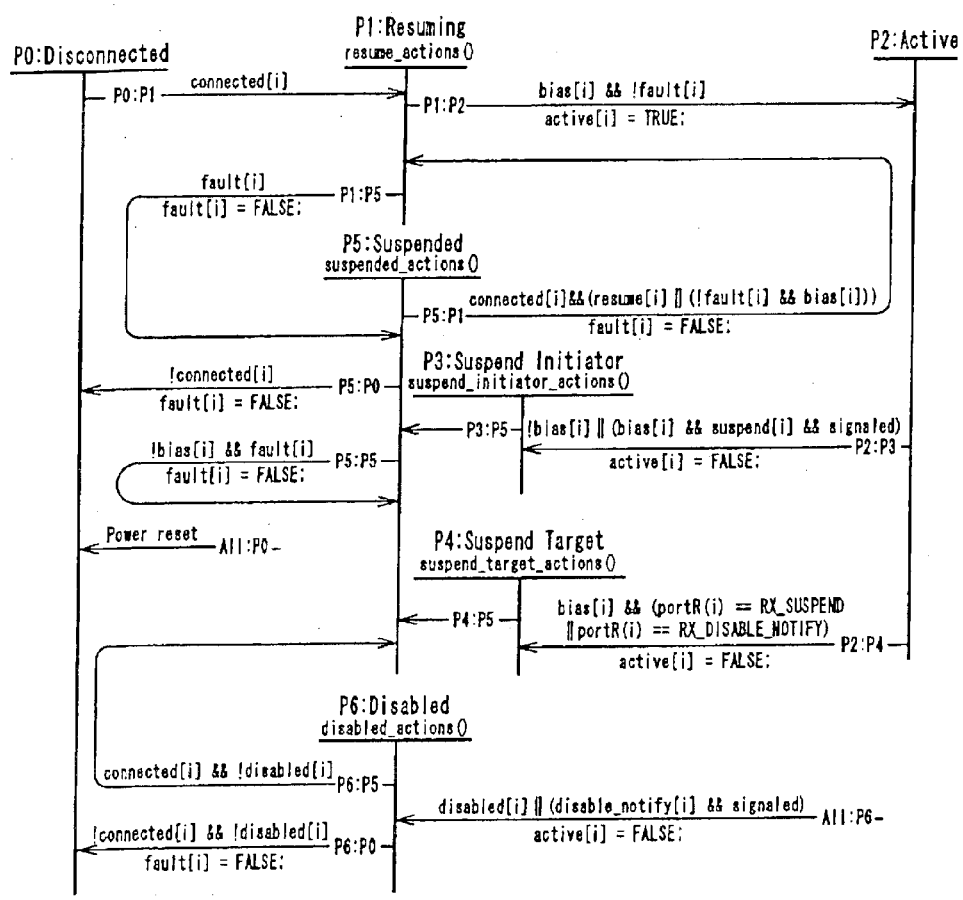
FIG. 5 is a transition diagram at a port connection.

In this embodiment, an arbitration phase is performed in accordance with the transition diagram shown in FIG. 32. The transition diagram shown in FIG. 32 additionally includes an RC1 (WAITGRANT) state and an RC2 (WAITIDLE) state, in addition to the A0 (Idle) state, A1 (Request) state, A2 (Grant) state, RX (Receive) state, TX (Transmit) state, and PH (PHY Response) state in the transition diagram shown in FIG. 4.

In the RC1 (WAITGRANT) state, a port waits to receive a grant signal from the parent port while keeping the request signal to the port. In the RC2 (WAITIDLE) state, an idle signal is transmitted to the parent node, and the node waits for the grant signal from the parent port to be changed to an idle signal.

The change from the A1 (Request) state to the RC1 (WAITGRANT) state is executed under the transition condition of "! child_request ( )", meaning that the request signal from the child port has been lost. The change from the A2 (Grant) state to the RC2 (WAITIDLE) state is executed under the transition condition of "portR (requesting_child)==RX_REQUEST_CANCEL", meaning that a request cancel signal (identical to an idle signal) has been received by the child port. In addition, the change from the RC1 (WAITGRANT) state to the RC2 (WAITIDLE) state is executed under the transition condition of "portR(parent_port)==RX_GRANT", meaning that a grant signal has been received from the parent port. The change from the RC2 (WAITIDLE) state to the A0 (Idle) state is executed under the transition condition of "portR(parent_port)==IDLE", meaning that an idle signal has been received from the parent port.

Since the arbitration phase is conducted in accordance with the transition diagram shown in FIG. 32, no situation arises in which a grant signal [00] is received in an idle state. This arrangement serves to prevent the occurrence of trouble that the grant signal is misunderstood as a suspend signal and the state is erroneously changed into a suspend state.

Figure 6A:
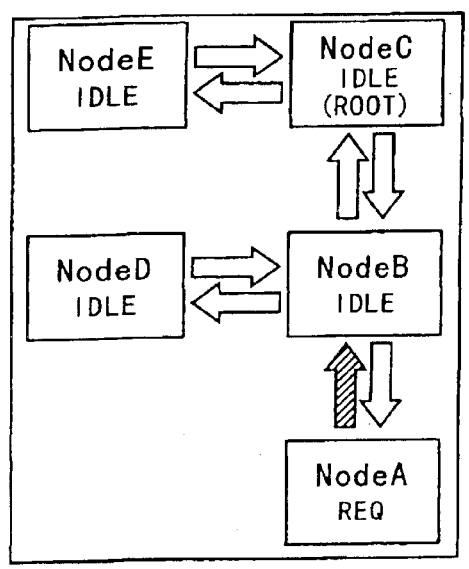
FIGS. 6A to 6D are diagrams showing a flow (1/2) of normal data transmission.
Figure 6B:
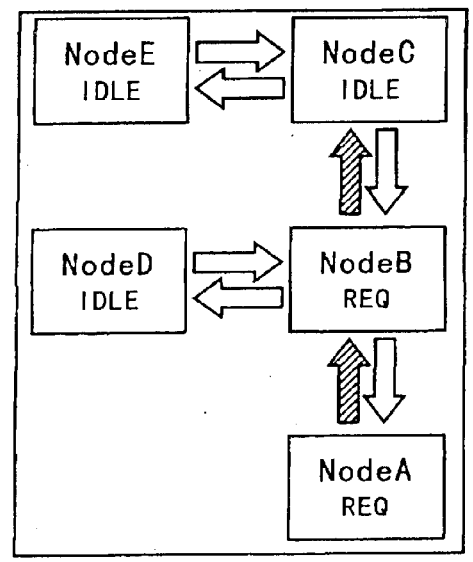

Hereinafter, a flow from (4.1) to (4.4) will be described, taking as an example a case where 5 nodes are connected and the node C among them is a root node. In this example, node A changes its state into a request state in order to obtain the right to use the bus for transmission, and transmits a request signal to node B (FIG. 6A). Upon receiving the request signal from node A, node B changes its state to a request state where node B repeats the request signal to node C which is a parent node. During the time node B is transmitting the request signal to node C (FIG. 6B), node B receives an idle signal from node A.

Figure 33A:
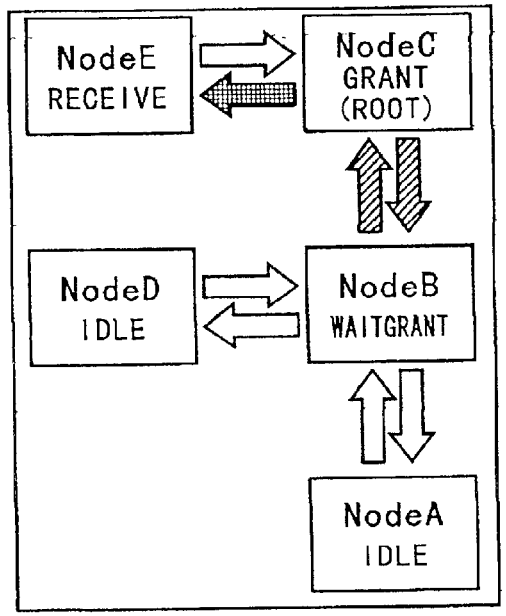
FIGS. 33A to 33D are diagrams showing a flow in the case where a node B receives an idle state from a node A in a request state.

(4.1) When node B receives a request cancel from node A, node B changes its state to a wait grant state (i.e., RC1 state in FIG. 32) where node B waits to receive a grant signal from node C while keeping the request signal. Upon receiving the request signal, node C confirms there is no other request signal than that from node B, and changes its state to a grant state where node C transmits a grant signal to node B. At the same time, node C transmits a data prefix signal to the other node, that is, node E. Upon receiving the data prefix signal, node E changes its state into a receive state (FIG. 33A).

Figure 33B:
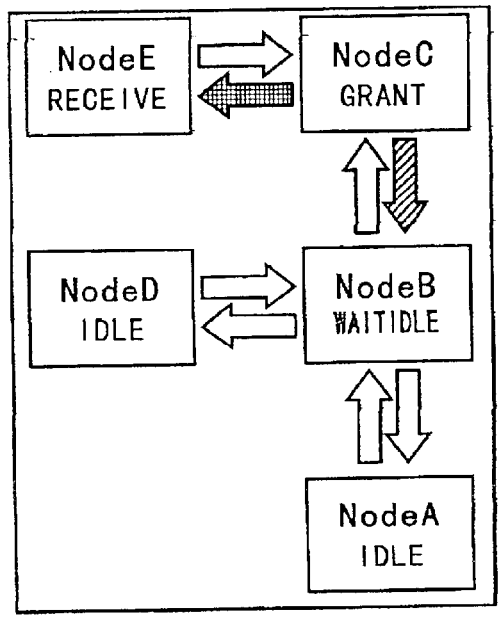

(4.2) Node B confirms that it has received the grant signal from node C, and after that, changes its state from the wait grant state to a wait idle state (i.e., RC2 state in FIG. 32) where node B transmits an idle signal to node C, and waits until the grant signal from node C changes to an idle signal (FIG. 33B).

Figure 33C:
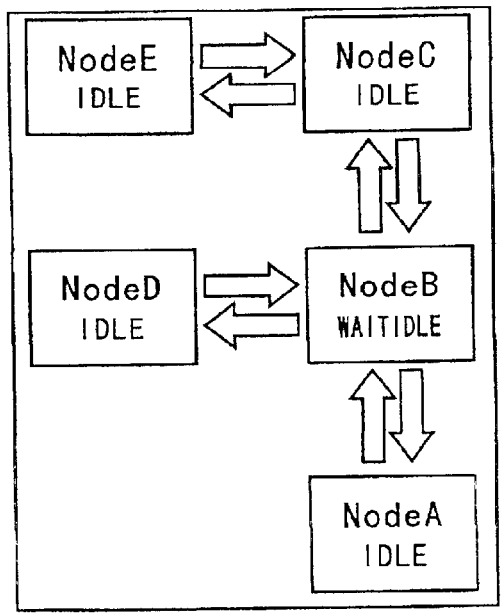

(4.3) Since node C is a root node, node C receives the idle signal from node B and returns its state to an idle state where node C transmits an idle signal to node B and cancels the data prefix signal to node E (FIG. 33C).

Figure 33D:
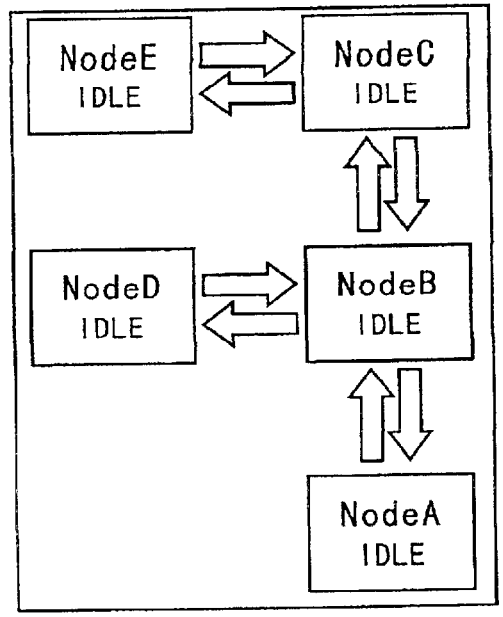

(4.4) Node B confirms that it has received the idle signal from node C, and after that, returns its state from the wait idle state to an idle state (FIG. 33D).

As described above, node B is designed so that, when node B receives an idle signal for canceling the request signal from node A in the request state, node B returns its state to an idle state after it has received an idle signal from node C. Therefore, node B is free from the situation in which it receives a grant signal [00] from node C in the idle state. This arrangement prevents node B from misunderstanding that it has received a suspend signal and erroneously changing its state to a suspend state.

Figure 6C:
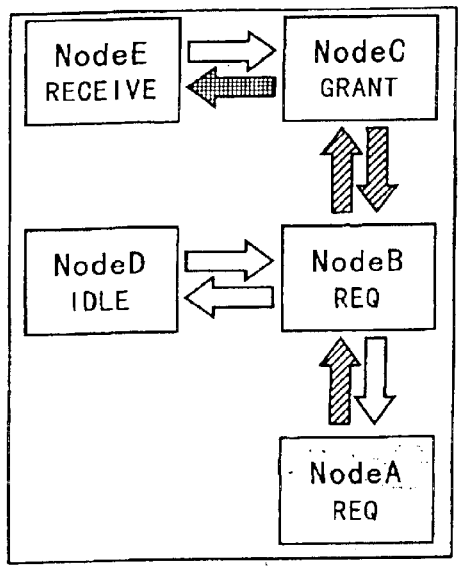
Figure 6D:
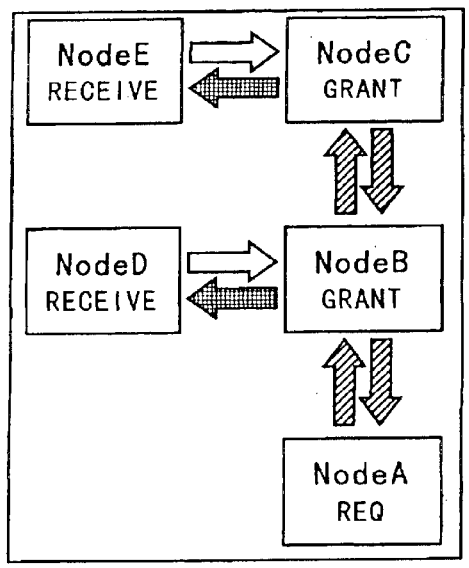
Figure 7A:
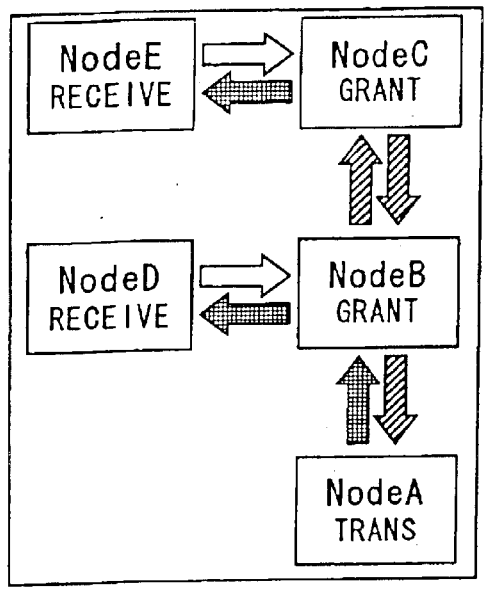
FIGS. 7A to 7D are diagrams showing a flow (2/2) of normal data transmission.
Figure 7B:
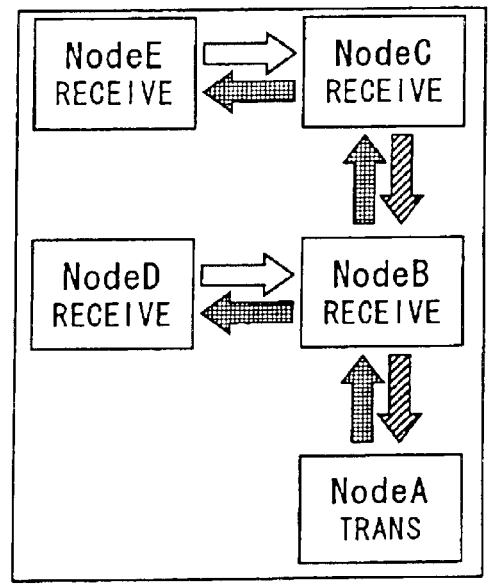
Figure 7C:
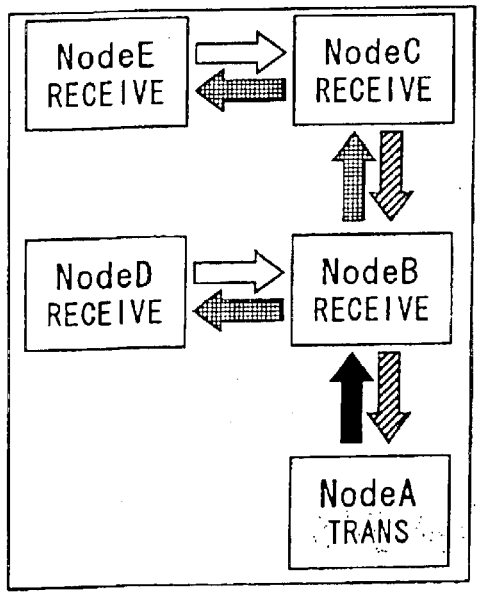
Figure 7D:
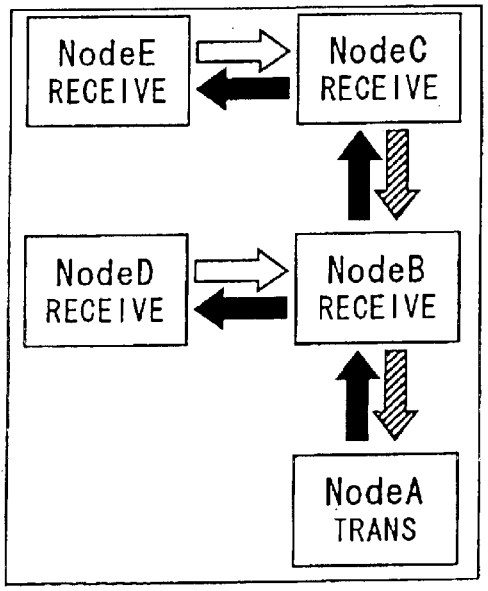
Figure 8:
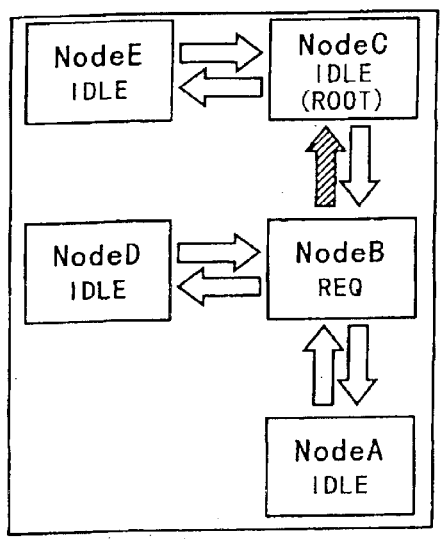
FIGS. 8A to 8C are diagrams showing a flow in the case where a node B receives an idle signal from a node A in a request state.
Figure 9A:
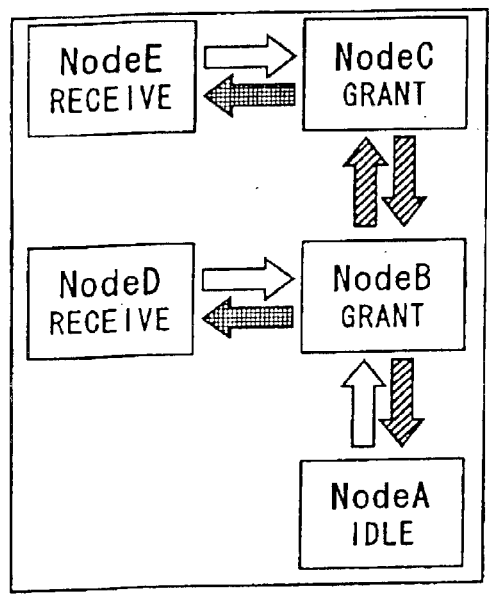
FIGS. 9A to 9C are diagrams showing a flow in the case where a node B receives a request cancel signal from a node A in a grant state.
Figure 9B:
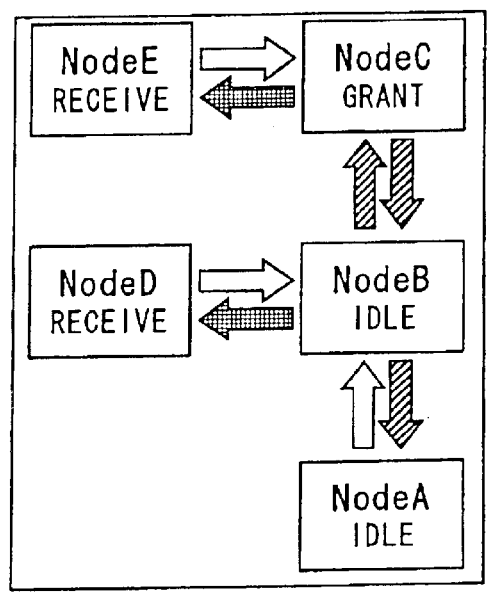
Figure 9C:
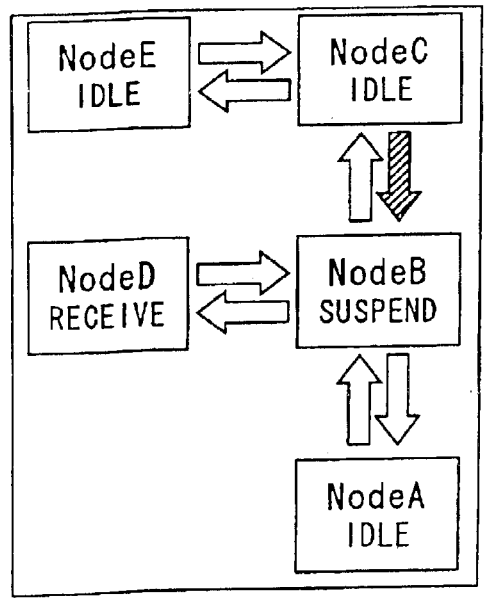

Hereinafter, a flow from (5.1) to (5.3) will be described, taking as an example a case where 5 nodes are connected and the node C among them is a root node. In this example, node A changes its state into a request state in order to obtain the right to use the bus for transmission, and transmits a request signal (FIG. 6A). Upon receiving the request signal from node A, node B changes its state to a request state where node B repeats the request signal to node C which is a parent node. Node B transmits the request signal to node C (FIG. 6B), and node C confirms that there is no request signal other than that from node B, and changes its state to a grant state where node C transmits a grant signal to node B (FIG. 6C). Upon receiving the grant signal, node B changes its state to a grant state. During the time node B, after changing its state to the grant state, is repeating the grant signal to node A (FIG. 6D), node B receives a request cancel signal (identical to an idle signal) from node A.

Figure 34A:
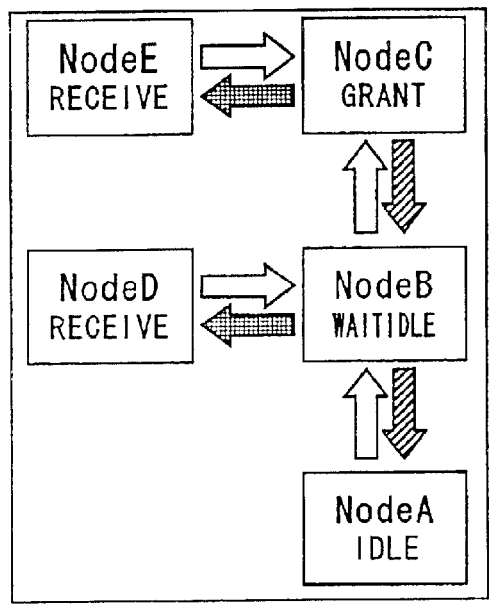
FIGS. 34A to 34C are diagrams showing a flow in the case where a node B receives a request cancel signal from a node A in a grant state.

(5.1) When node B receives a request cancel from node A, node B changes its state to a wait idle state (i.e., the RC2 state in FIG. 32) where node B transmits an idle signal to node C and waits until the grant signal from node C as a parent node changes to an idle signal (FIG. 34A).

Figure 34B:
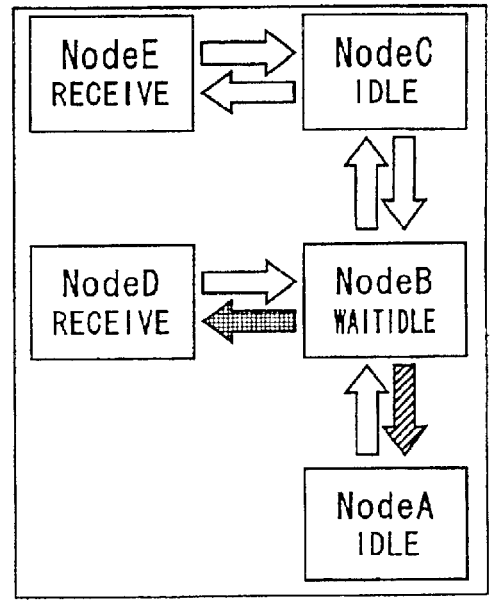

(5.2) Since node C is a root node, node C receives the idle signal from node B and returns its state to an idle state where node C transmits an idle signal to node B and cancels the data prefix signal to node E (FIG. 34B).

Figure 34C:
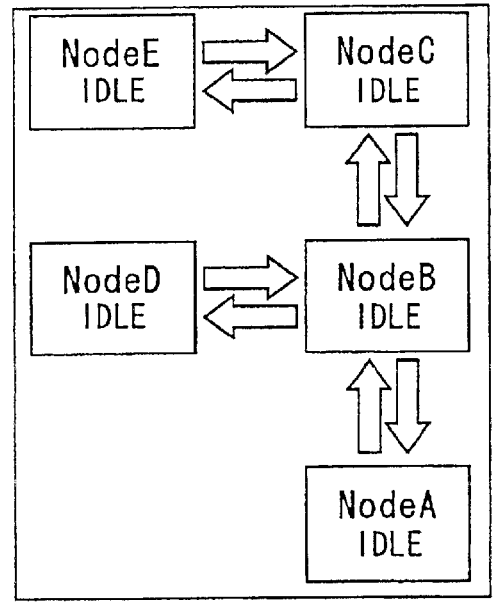

(5.3) Node B confirms that it has received the idle signal from node C, and after that, cancels the data prefix signal to node D and returns its state from the wait idle state to an idle state (FIG. 34C).

As described above, node B is designed so that, when node B receives a request cancel signal (identical to an idle signal) from node A in the grant state, node B returns its state to an idle state after it has received an idle signal from node C. Therefore, node B is free from the situation in which it receives a grant signal [00] from node C in the idle state. This arrangement serves to prevent node B from misunderstanding that it has received a suspend signal and erroneously changing its state to a suspend state.

As described above, in this embodiment, when an idle signal for canceling a request signal is received from the child node in a request state, the state is changed to an idle state after an idle signal is received from the parent node. Therefore, there arises no situation in which a grant signal [00] is received from the parent node in an idle state. This arrangement serves to prevent the occurrence of problems that may occur if the grant signal is misunderstood as a suspend signal and the state is erroneously changed to a suspend state.

In addition, when a request cancel signal (i.e., an idle signal) is received from the child node in a grant state, the state is changed to an idle state after receiving an idle signal from the parent node. Therefore, there arises no situation in which a grant signal [00] is received from the parent node in an idle state. This arrangement serves to prevent the occurrence of problems that may result if the grant signal is misunderstood as a suspend signal and the state is erroneously changed to a suspend state.

In the above embodiment, the present invention has been described as being applicable to the physical layer circuit constituting the physical layer which conforms to the IEEE 1394 standard, and electronic equipment including the physical layer circuit. However, the present invention is not limited thereto, but may be applicable to other physical layer circuits which have the same problems to be solved as described above.

According to the present invention, the physical layer circuit is operated in such a manner that, when receiving a first signal from a child node, the physical layer circuit changes its state from a first state to a second state and sends a first signal to a parent node, and when receiving a third signal for canceling the first signal from the child node before receiving a second signal corresponding to the first signal from the parent node, the physical layer circuit sends the third signal to the parent node after receiving the second signal from the parent node, and furthermore, the physical layer circuit returns its state from the second state to the first state after receiving the third signal from the parent node. In this manner, there arises no situation in which the second signal is received from the parent node in the first state, thereby avoiding the occurrence of problems which may be caused if such a situation occurs.

In addition, the physical layer circuit is operated in such a manner that, when receiving a first signal from a child node, the physical layer circuit changes its state from a first state to a second state and sends the first signal to a parent node, and when receiving a third signal for canceling the first signal from the child node after receiving a second signal corresponding to the first signal from the parent node and changing its state from the second state to the third state, the physical layer circuit sends the third signal to the parent node, and furthermore, the physical layer circuit returns its state from the third state to the first state after receiving the third signal from the parent node. In this manner, there arises no situation in which the second signal is received from the parent node in the first state, thereby avoiding the problems which may be caused if such a situation occurs.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Electronic equipment, comprising:

a physical layer circuit having a first transmitter operable to communicate with a child node, a second transmitter operable to communicate with a parent node, and a controller operable to control said physical layer circuit such that, when said physical layer circuit receives a first signal from said child node, said physical layer circuit changes from a first state to a second state and transmits said first signal to said parent node, when said physical layer circuit receives a third signal for canceling said first signal from said child node before receiving a second signal corresponding to said first signal from said parent node, said physical layer circuit transmits said third signal to said parent node after receiving said second signal from said parent node, and when said physical layer circuit receives said third signal from said parent node, said physical layer circuit changes from said second state to said first state.

2. Electronic equipment according to claim 1, wherein said physical layer circuit constitutes a physical layer which conforms to the IEEE 1394 standard.

3. Electronic equipment according to claim 2, wherein said first state is an idle state and said second state is a request state, and wherein said first signal is a request signal for obtaining a right to use a bus for transmission, said second signal is a grant signal, and said third signal is an idle signal.

4. A method for controlling a state of a physical layer circuit, comprising:

receiving in the physical layer circuit a first signal from a child node, upon receipt of the first signal, controlling the physical layer circuit to change from a first state to a second state and to transmit the first signal to the parent node, receiving in the physical layer circuit a third signal for canceling the first signal from the child node before receiving a second signal corresponding to the first signal from the parent node, controlling the physical layer circuit to transmit the third signal to the parent node after receiving the second signal from the parent node, and controlling the physical layer circuit to change from the second sate to the first state after receiving the third signal from the parent node.

5. A method for controlling a state of a physical layer circuit according to claim 4, wherein the physical layer circuit constitutes a physical layer which conforms to the IEEE 1394 standard.

6. A method for controlling a state of a physical layer circuit according to claim 5, wherein the first state is an idle state and the second state is a request state, and wherein the first signal is a request signal for obtaining a right to use a bus for transmission, the second signal is a grant signal, and the third signal is an idle signal.

7. Electronic equipment, comprising:

a physical layer circuit having a first transmitter operable to communicate with a child node, a second transmitter operable to communicate with a parent node, and a controller operable to control said physical layer circuit such that, when said physical layer circuit receives a first signal from said child node, said physical layer circuit changes from a first state to a second state and transmits said first signal to said parent node, when said physical layer circuit receives a third signal for canceling said first signal from said child node after receiving a second signal corresponding to said first signal from said parent node and changes from said second state to a third state, said physical layer circuit transmits said third signal to said parent node, and after receiving said third signal from said parent node, said physical layer circuit changes from said third state to said first state.

8. Electronic equipment according to claim 7, wherein said physical layer circuit constitutes a physical layer which conforms to the IEEE 1394 standard.

9. Electronic equipment according to claim 8, wherein said first state is an idle state, said second state is a request state, and said third state is a grant state, and wherein said first signal is a request signal for obtaining a right to use a bus for transmission, said second signal is a grant signal, and said third signal is an idle signal.

10. A method for controlling a state of a physical layer circuit, comprising:

receiving in the physical layer circuit a first signal from a child node;

upon receipt of the first signal, controlling the physical layer circuit to change from a first state to a second state and to transmit the first signal to the parent node;

receiving in the physical layer circuit a third signal for canceling the first signal from the child node after receiving a second signal corresponding to the first signal from the parent node;

controlling the physical layer circuit to change from the second state to a third state and to transmit the third signal to the parent node;

receiving in the physical layer circuit the third signal from the parent node; and controlling the physical layer circuit to change from the third state to the first state.

11. A method for controlling a state of a physical layer circuit according to claim 10, wherein the physical layer circuit constitutes a physical layer which conforms to the IEEE 1394 standard.

12. A method for controlling a state of a physical layer circuit according to claim 11, wherein the first state is an idle state, the second state is a request state, and the third state is a grant state, and wherein the first signal is a request signal for obtaining a right to use a bus for transmission, the second signal is a grant signal, and the third signal is an idle signal.

* * * * *